US006757444B2

(12) United States Patent
Matsugu et al.

(10) Patent No.: US 6,757,444 B2
(45) Date of Patent: *Jun. 29, 2004

(54) IMAGE EXTRACTION APPARATUS AND METHOD

(75) Inventors: Masakazu Matsugu, Chiba (JP); Hideo Takiguchi, Kawasaki (JP); Koji Hatanaka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/561,780

(22) Filed: May 1, 2000

(65) Prior Publication Data

US 2003/0099397 A1 May 29, 2003

Related U.S. Application Data

(62) Division of application No. 08/886,076, filed on Jul. 2, 1997, now Pat. No. 6,167,167.

(30) Foreign Application Priority Data

Jul. 5, 1996 (JP) .............................. 8-194113

(51) Int. Cl.[7] ................................. G06K 9/36
(52) U.S. Cl. ........................ 382/283; 382/199; 358/538
(58) Field of Search .................... 382/282–284, 382/131, 197–199, 173, 180, 203, 220, 162–165, 103, 107; 348/251, 586–587, 597–599, 239, 241, 169, 699–700, 14.15; 358/450, 540, 453, 537, 538, 428, 447, 504, 517–518; 345/626

(56) References Cited

U.S. PATENT DOCUMENTS

| 4,882,622 | A | | 11/1989 | Uzuda ........................ 358/538 |
|---|---|---|---|---|
| 4,958,217 | A | | 9/1990 | Kimura et al. .............. 358/538 |
| 5,034,986 | A | * | 7/1991 | Karamann et al. .......... 382/103 |
| 5,146,511 | A | * | 9/1992 | Shirasaki .................... 382/197 |
| 5,319,551 | A | * | 6/1994 | Sekiguchi et al. .......... 382/131 |
| 5,355,446 | A | | 10/1994 | Maayan ...................... 345/626 |
| 5,471,535 | A | | 11/1995 | Ikezawa et al. ............. 382/199 |
| 5,519,436 | A | | 5/1996 | Munson ................... 348/14.15 |

(List continued on next page.)

FOREIGN PATENT DOCUMENTS

| EP | 0 400 998 A2 | 12/1990 | ............ H04N/5/14 |
|---|---|---|---|
| EP | 0 532 823 A2 | 3/1993 | ............ G06F/15/68 |
| EP | 0 634 872 A2 | 1/1995 | ............ H04N/7/24 |
| EP | 0 671 706 A2 | 9/1995 | ............ G06T/7/20 |
| EP | 0 706 155 A1 | 4/1996 | ............ G06T/9/00 |

OTHER PUBLICATIONS

Huang et al., "Foreground/Background Segmentation of Color Images By Integration of Multiple Cues," 1995 IEEE.

(List continued on next page.)

Primary Examiner—Leo Boudreau
Assistant Examiner—Ishrat I Sherali
(74) Attorney, Agent, or Firm—Morgan & Finnegan, LLP

(57) ABSTRACT

There is disclosed an image extraction method for extracting, from a subject image that records both the background and the object to be extracted, image data of the object using a mask. An initial mask used for extracting the subject region is generated on the basis of difference data between the subject image and the background image that records the background alone, the region of the initial mask is grown on the basis of the similarity between the features of a first region and its neighboring second region in the subject image corresponding to the initial mask, and the image data of the object is extracted from the first image on the basis of the grown mask region.

15 Claims, 28 Drawing Sheets

U.S. PATENT DOCUMENTS

| | | | |
|---|---|---|---|
| 5,557,685 A | 9/1996 | Schlossers et al. | 382/107 |
| 5,598,482 A | 1/1997 | Balasubramanian et al. | 382/199 |
| 5,768,438 A | 6/1998 | Etoh | 382/251 |
| 5,818,962 A | 10/1998 | Mizukami | 382/180 |
| 5,875,040 A | 2/1999 | Matraszek et al. | 358/453 |
| 5,881,171 A | 3/1999 | Kinjo | 382/199 |
| 5,914,748 A * | 6/1999 | Parluski et al. | 348/239 |
| 5,999,639 A * | 12/1999 | Rogers et al. | 382/132 |
| 6,167,167 A * | 12/2000 | Matsugu et al. | 382/283 |
| 6,453,069 B1 | 9/2002 | Matsugu et al. | 382/173 |

OTHER PUBLICATIONS

Waldowski, "A New Segmentation Algorithm for Videophone Applications Based on Stereo Image Pairs," IEEE Transactions on Communications, 39, No. 12, Dec. 1991.

Kim et al., "Moving Target Extraction Algorithm for Selective Coding," SPIE, vol. 2727, pp. 1130–1139.

Yemez et al., "Region Growing Motion Segmentation and Estimation in Object–Oriented Video Coding," 1996 IEEE.

Chu et al., "The Integration of Image Segmentation Maps Using Region and Edge Information," IEEE Transactions on Pattern Analysis and Machine Intelligence, No. 12, Dec. 1993.

Gambotto, "A new approach to combining region growing and edge detection," Pattern Recognition Letters, vol. 14, No. 11, 11/93, 869–875.

Cortez et al., "Image segmentation towards new image representation methods," Signal Processing Image Communication, vol. 6, No. 6, 2/95, 485–498.

Lettera et al., "Foreground/Background Segmentation in Videotelephony," Signal Processing, Image Communication, vol. 1, No. 2, 10/89, 181–189.

Kass et al., "Snakes: Active Contour Models," International Journal of Computer Vision, (1988), 321–331.

\* cited by examiner

SUBJECT IMAGE

BACKGROUND IMAGE

NORMALIZED EDGE
INTENSITY IMAGE (SUBJECT)

NORMALIZED EDGE
INTENSITY IMAGE (BACKGROUND)

NORMALIZED EDGE INTENSITY IMAGE
(AFTER THRESHOLD VALUE PROCESS)

INITIAL SEED
(INITIAL MASK REGION)

MASK AFTER REGION GROWING

MASK AFTER HOLE FILLING
AND WHISKER REMOVAL

INTERMEDIATE EXTRACTED IMAGE

AFTER CONTOUR SHAPING PROCESS

INITIAL SEED

AFTER MAXIMUM REGION GROWING RANGE IS SET

MAXIMUM REGION GROWING RANGE
(AFTER MEDIAN FILTER)

MASK AFTER REGION GROWING
(BEFORE HOLE FILLING)

EXTRACTED IMAGE

INPUT IMAGE

PRIMARY FEATURE (DISPARITY VECTOR, ETC.) DISTRIBUTION DIVISION RESULT

ABSOLUTE DISPARITY VALUE
SMALL
MIDDLE
LARGE

500
SELECT

REGION GROWING (SEGMENTATION) RESULT BASED ON SECONDARY FEATURE (COLOR COMPONENT, ETC.)

IMAGE EXTRACTION APPARATUS AND METHOD

This is a divisional of application Ser. No. 08/886,076, now U.S. Pat. No. 6,167,167, filed Jul. 2, 1997.

BACKGROUND OF THE INVENTION

1. Field of the Invention

The present invention relates to an image extraction apparatus and method for extracting a target subject from a background image and a subject image. More particularly, the present invention is directed to a method and apparatus for appropriately generating a mask used for extracting a target subject.

2. Related Arts

Conventionally, as general techniques for realizing image extraction, a chromakey method using a specific color background, a videomatte method for generating a key signal by performing a histogram process, difference (or differential) process, contour enhancement or contour tracking process of an image signal (*The Television Society Technical Report*, Vol. 12, pp. 29–34, 1988), and the like are known.

A technique for performing image extraction based on the difference from the background image is a state-of-the-art one, and for example, Japanese Patent Laid-Open No. 4-216181 discloses a technique for detecting or extracting a target object in a plurality of specific regions in an image by setting a mask image (i.e., a specific processing region) in difference data between the background image and the image to be processed.

Furthermore, Japanese Patent Publication No. 7-16250 discloses a technique for obtaining color-converted data of an original image including a background using a color model of the object to be extracted, and the existence probability distribution of the object to be extracted from brightness difference data between the background image and the original image.

In the difference method from the background image, the luminance level or color component difference between the pixels of the background image and the subject image is normally expressed by a predetermined evaluation function, and the evaluation function is subjected to a thresholding process to extract a region having a difference level equal to or higher than an initial value. As the evaluation function, the correlation between blocks having individual points as centers and a predetermined size (Rosenfeld, A. and Kak, A. C., Digital Picture Processing (2nd ed.), Academic Press, 1982), normalized principal component features (*Journal of the Institute of Electronics, Information and Communication Engineers*, Vol. J74-D-II, pp. 1731–1740), a weighted sum value of a standard deviation and a difference value (*Journal of the Television Society*, Vol. 45, pp. 1270–1276, 1991), a local histogram distance associated with hue and luminance level (*Journal of the Television Society*, Vol. 49, pp. 673–680, 1995), and the like are used.

Japanese Patent Laid-Open No. 4-328689 and Japanese Patent Publication No. 7-31248 disclose a method of extracting a moving object alone by extracting motion vectors or inter-frame difference data from moving images. Japanese Patent Publication Nos. 7-66446, 6-14358, and 4-48030 disclose a method of extracting a moving object based on the difference from the background image. Furthermore, a method of extracting the binocular disparity distribution (i.e., the distance distribution from image sensing means) from images from right and left different view point positions obtained using a binocular image sensing system, and segmenting an object from the background on the basis of the disparity distribution (1995 *Information System Society Meeting of the Society of Electronics, Information and Communication Engineers*, pp. 138), or the like is known.

However, of the above-mentioned prior arts, the chromakey method suffers from the following problems:

i: this method cannot be used outdoors due to serious background limitations, and ii: color omission occurs.

Also, the videomatte method suffers from the following problems:

i: the contour designation must be manually and accurately performed in units of pixels, and ii: such operation requires much labor and skill.

Furthermore, the difference method from the background image is normally difficult to realize due to the following problems:

i: the background is hard to distinguish from the subject in a partial region of the subject including a portion similar to the background, ii: the difference method is readily influenced by variations in image sensing condition between the background image and subject image, iii: a shadow portion formed by the subject is hard to remove, and iv: in order to faithfully extract the boundary line between the background and subject, the background image and subject image must have considerably different image characteristics (pixel values and the like) in the vicinity of the boundary therebetween.

The technique disclosed in Japanese Patent Publication No. 7-16250 is not suitable for image extraction of an arbitrary unknown object since it requires a color model for the object to be extracted.

In either the method of extracting a moving object from moving images or the method of extracting a subject from the disparity distribution, it is generally hard to extract a subject with high precision independently of the contrast in the boundary portion between the subject and background.

SUMMARY OF THE INVENTION

It is an object of the present invention to provide an image extraction apparatus and method, which can stably extract a subject image in which the background and subject have no distinct difference between their image characteristics.

It is another object of the present invention to provide an image extraction apparatus and method which can obtain a large area of a subject region before region growing by a small number of processing steps, and can extract details of a contour shape.

It is still another object of the present invention to provide an image extraction apparatus and method which can execute a process for equalizing the contour line of a mask after region growing with that of an actual subject without being influenced by the background pattern near the contour line of the subject.

It is still another object of the present invention to provide an image extraction apparatus and method which can stably grow an initial mask only in a subject region independently of variations in the region growing condition, i.e., the tolerance value of a feature difference from a neighboring region.

It is still another object of the present invention to provide an image extraction apparatus and method which can suppress variations in edge intensity distribution caused by a difference in image sensing conditions between the background image and the subject image, noise, or the like, and can accurately extract the contour shape of the subject and the edge of a background portion present in the subject region.

It is still another object of the present invention to provide an image extraction apparatus and method which can stably extract a subject image even when the edge intensity serving as a boundary between the subject and background is small and the subject includes a relatively thin shape.

It is still another object of the present invention to provide an image extraction apparatus and method which can stably extract the contour shape of a subject without being influenced by the edge distribution of a background portion present in the vicinity of the subject.

It is still another object of the present invention to provide an image extraction apparatus and method which can automatically retrieve an incomplete partial shape after region growing on the basis of the condition of shape continuity, and can smooth shape data.

It is still another object of the present invention to provide an image extraction apparatus and method which can stably extract a subject image independently of any specific difference between the image characteristics of the background and subject without being influenced by the background pattern.

It is still another object of the present invention to provide an image extraction apparatus and method which can stably and accurately extract a subject image upon executing extraction based on region growing.

It is still another object of the present invention to provide an image extraction apparatus and method which can obtain an extracted image with stably high precision independently of any specific difference between the image characteristics of the background and subject upon executing extraction based on the difference from the background image.

It is still another object of the present invention to provide an image extraction apparatus and method which can extract a subject on the basis of region growing that can faithfully reconstruct the contour shape of the object to be extracted.

It is still another object of the present invention to provide an image extraction apparatus and method which can extract a region closest to a subject while suppressing unlimited region growing.

It is still another object of the present invention to provide an image extraction apparatus and method which can obtain stably high extraction precision even for a subject having a complicated contour shape by suppressing region growing across an edge and region growing from an edge.

It is still another object of the present invention to provide an image extraction apparatus and method which can obtain stably high extraction performance even in the presence of noise such as a shadow present outside a subject (in the background) or an unclear portion of the contour of the subject.

It is still another object of the present invention to provide an image extraction apparatus and method which can realize region growing that can satisfactorily approximate the outer shape of the extracted subject to a correct subject shape even when the shape of a partial region extracted in advance does not match the contour shape of the subject.

It is still another object of the present invention to provide an image extraction apparatus and method which can realize automatic extraction of a specific subject from moving images with high precision.

It is still another object of the present invention to provide an image extraction apparatus and method which can realize automatic extraction of a specific subject with high precision using a plurality of images obtained from different view points.

In order to achieve the above objects, according to the present invention, there is provided an image extraction method for extracting, from a first image that records both a background and an object to be extracted, image data of the object using a mask, comprising:

the first step of generating an initial mask for extracting an image of the object on the basis of difference data between the first image and a second image that records the background alone;

the second step of growing a region of the generated initial mask on the basis of a similarity between features of a first region of the first image corresponding to the initial mask, and a second region in the vicinity of the first region; and the third step of extracting the image data of the object from the first image on the basis of the grown mask region.

According to the image extraction method, subject extraction that can eliminate the influence of noise and variations in image sensing condition, and automatically removes any light shadow portion can be realized. Also, a subject region including a region having image characteristics similar to those of a background image can be extracted in the subject.

In order to achieve the above objects, according to the present invention, there is provided an image extraction method comprising:

the partial region extraction step of extracting a partial region as a portion of a subject to be extracted from an input image;

the region growing step of growing the extracted partial region using the extracted partial region as a seed by thresholding a similarity to a neighboring region in which the threshold value being set on the basis of a feature distribution at individual points of the input image; and the extraction step of extracting an image of the subject on the basis of the region after region-growing.

According to the image extraction method, a subject image can be extracted with stably high precision independently of variations in parameters used in similarly evaluation, a shadow in the background, and complexity of the image pattern of the subject upon executing extraction based on region growing.

In order to achieve the above objects, according to the present invention, there is provided an image extraction apparatus for extracting, from a first image including both a background and an object to be extracted, image data of the object using a mask, comprising:

temporary storage means for receiving and temporarily storing the first image and a second image that records the background;

initial mask generating means for generating an initial mask of an extraction region on the basis of difference data between the stored first and second images;

region growing means for growing a region of the initial mask on the basis of a feature similarity to a neighboring region; and first image extraction means for extracting the image data of the object from the first image on the basis of the grown mask region.

According to the image extraction apparatus, upon extraction of an initial mask, the influence of noise and variations in image sensing condition can be eliminated, and any light shadow portion can be automatically removed. Also, a subject region can be stably and automatically extracted independently of the presence/absence of a region similar to a background image in the subject.

In order to achieve the above objects, according to the present invention, there is provided an image extraction apparatus comprising:

partial region extraction means for extracting a partial region as a portion of a subject to be extracted from an input image;

region growing means for growing the extracted partial region using the extracted partial region as a seed by thresholding a similarity to a neighboring region in which the threshold value being set on the basis of a feature distribution at individual points of the input image; and extraction means for extracting an image of the subject on the basis of the region after region-grown.

According to the image extraction apparatus, a subject image can be extracted with stably high precision independently of variations in parameters used in similarly evaluation, a shadow in the background, and complexity of the image pattern of the subject upon executing extraction based on region growing.

According to a preferred aspect of the present invention, the first step includes the step of using as the initial mask a binary image region obtained by a binarization process of difference data representing a difference between image data of the first and second images using a predetermined threshold value. The details of the subject shape can be extracted in a process before region growing while eliminating the influence of noise and the like.

According to a preferred aspect of the present invention, the difference data represents a brightness difference between the first and second images.

According to a preferred aspect of the present invention, the difference data represents a color difference between the first and second images.

According to a preferred aspect of the present invention, the first step comprises:

the step of obtaining a first binary image region by a binarization process of data representing a brightness difference between the first and second images using a predetermined threshold value;

the step of obtaining a second binary image region by a binarization process of data representing a color difference between the first and second images using a predetermined threshold value; and the step of generating the initial mask by combining the first and second binary image regions.

According to a preferred aspect of the present invention, the second step includes the step for judging based on brightness and hue similarities between the first and second regions if a pixel in the second region is to be incorporated in the first region, and growing the mask region upon incorporating the pixel.

According to a preferred aspect of the present invention, the second step comprises:

the step of respectively extracting first and second edge intensity images from the first and second images;

the step of calculating an edge density on the basis of data representing a difference between the first and second edge intensity images; and the step of suppressing growing of the mask when the calculated edge density is not more than a predetermined threshold value in a growing direction. Even when the region growing condition is relaxed or roughly set, region growing outside the subject can be suppressed, and high-precision subject extraction can be realized. Also, even when the initial mask region includes a region other than the subject (e.g., a shadow portion), growing from such region can be suppressed.

According to a preferred aspect of the present invention, the first step comprises:

the step of normalizing the difference data representing the difference between the first and second images, and generating the initial mask on the basis of normalized brightness difference data. In object extraction, the influence of slight variations in image sensing condition (white balance characteristics, illumination characteristics, exposure condition, and the like) between the first and second images can be suppressed.

According to a preferred aspect of the present invention, the first step comprises:

the step of extracting first and second edge intensity images representing edge intensities of the first and second images, respectively; and the step of normalizing both the first and second edge intensity images using a predetermined normalization coefficient when the first edge intensity image is an image having a small number of edges, the normalization coefficient being a maximum intensity value of the first edge intensity image. For this reason, even when the first and second images suffer slight variations in image sensing condition (white balance characteristics, illumination characteristics, exposure condition, and the like), edge intensity variations can be prevented from being amplified. In this manner, the probability of background edge data being left in a region outside a subject in edge difference data can be made very low.

According to a preferred aspect of the present invention, the first step comprises:

the step of extracting first and second edge intensity images representing edge intensities of the first and second images, respectively; and the step of normalizing both the first and second edge intensity images using a maximum edge intensity value within a predetermined size region having a predetermined point of the first edge intensity image as a center when the first edge intensity image is an image having many edges. Accordingly, when the subject has a fine partial shape, the contour shape of details can be stably extracted even when the edge intensity is low, and noise amplification in a low-contrast partial region in the vicinity of the subject can be suppressed upon normalization.

According to a preferred aspect of the present invention, the second step includes the step of comparing differences between brightness and hue values of the first and second regions with predetermined threshold values, and determining that the second region is similar to the first region when the differences are smaller than the predetermined threshold values. Accordingly, when the contour shape is incomplete (e.g., it includes discontinuous uneven portions different from the actual shape) as a result of region growing, correction of such shape can be performed while automatically considering the image feature's continuity and shape continuity in the subject.

According to a preferred aspect of the present invention, the second step further comprises the fourth step of shaping a contour line of the grown mask, and the fourth step comprises:

the step of detecting the contour line of the grown mask;

the step of generating an edge intensity image representing a difference between the first and second images;

the step of setting a region having a predetermined width in a direction perpendicular to an extending direction of the contour line in the edge intensity image;

the step of selecting a plurality of pixels of the edge intensity images in the region of the predetermined width as contour point candidates; and the step of selecting one contour point on the basis of continuity between a pixel on the contour line and the plurality of contour point candidates, thereby shaping the contour line of the mask. Accordingly, when the contour shape is incomplete (e.g., it includes discontinuous uneven portions different from the actual shape) as a result of region growing, correction of such shape can be performed while automatically considering the image feature continuity and shape continuity in the subject.

According to a preferred aspect of the present invention, the continuity is determined by inspecting pixel value continuity.

According to a preferred aspect of the present invention, the continuity is determined by inspecting shape continuity.

According to a preferred aspect of the present invention, the continuity is determined by inspecting continuity with a pixel present inside the contour line.

According to a preferred aspect of the present invention, the continuity is determined by weighting and evaluating pixel value continuity and shape continuity.

According to a preferred aspect of the present invention, the fourth step further includes the step of smoothing the shaped contour line.

According to a preferred aspect of the present invention, the fourth step comprises:

the active contour shaping step of recursively executing a process for deforming or moving a contour shape of the mask to minimize a predetermined evaluation function on the basis of the initial mask or a contour of the grown mask, and image data of the first image. Accordingly, the shape of a non-grown region that remains as a result of region growing can be corrected and retrieved.

According to a preferred aspect of the present invention, the active contour shaping step comprises:

generating a contour line by performing an active contour shaping process on the data of the initial mask, and performing an active contour shaping process of the image data of the first image on the basis of the generated contour line. Hence, the contour shape of the subject can be normally extracted without being influenced by the background pattern.

According to a preferred aspect of the present invention, the partial region extraction step includes the step of extracting the partial region on the basis of a difference between a background image excluding the subject, and a subject image including the subject. Consequently, the extracted image can be obtained with stably high precision independently of any specific difference between the image characteristics of the background and subject in subject extraction based on the difference from the background image and region growing.

According to a preferred aspect of the present invention, the feature distribution is an edge distribution of the subject. As a result, the contour shape of a subject can be faithfully reconstructed by suppressing unlimited growing in the vicinity of an edge upon executing region growing.

According to a preferred aspect of the present invention, the feature distribution is a distribution within a maximum growing range set based on the partial region. Accordingly, region growing that can eliminate the influence of noise, shadows, and illumination conditions, and can roughly obtain the subject shape can be realized inside a partial region and a region in the vicinity of the partial region.

According to a preferred aspect of the present invention, the threshold value is set to assume a value that suppresses growing of the region at an edge position as compared to a non-edge position. So, region growing outside an edge, and region growing having an edge as a start point can be suppressed, and the contour shape of a subject after region growing can be stabilized.

According to a preferred aspect of the present invention, the threshold value is set to assume a value that promotes growing of the region in a region within the maximum growing range, and to assume a value that suppresses growing of the region outside the maximum growing region. Hence, extraction faithful to the subject shape can be realized even in a partial region having a low-contrast boundary from the background, and a partial region with a shadow.

According to a preferred aspect of the present invention, the maximum growing range is obtained as an output when a shape of the partial region is smoothed using a smoothing filter having a predetermined size. Accordingly, even when the shape of a partial region extraction in advance has a missing portion or protruding portion, and has a large local difference from the subject shape, region growing that can relax the influence of such difference can be realized.

According to a preferred aspect of the present invention, the input image includes time-serial images, and the partial region extraction step includes the step of extracting the partial region on the basis of difference data between image frames at different times of the input image. As a consequence, a subject that moves in an image can be automatically extracted with high precision based on the distribution of motion vectors.

According to a preferred aspect of the present invention, the input image includes a plurality of images from a plurality of different view point positions, and the partial region extraction step includes the step of extracting the partial region on the basis of a disparity distribution between the input images. Accordingly, a specific subject can be automatically extracted with high precision based on the distribution of subject distances.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

The preferred embodiments of an image extraction apparatus of the present invention will be described below with reference to the accompanying drawings. The image extraction apparatus of this embodiment is applied to an image sensing system.

<First Embodiment>

Figure 1:
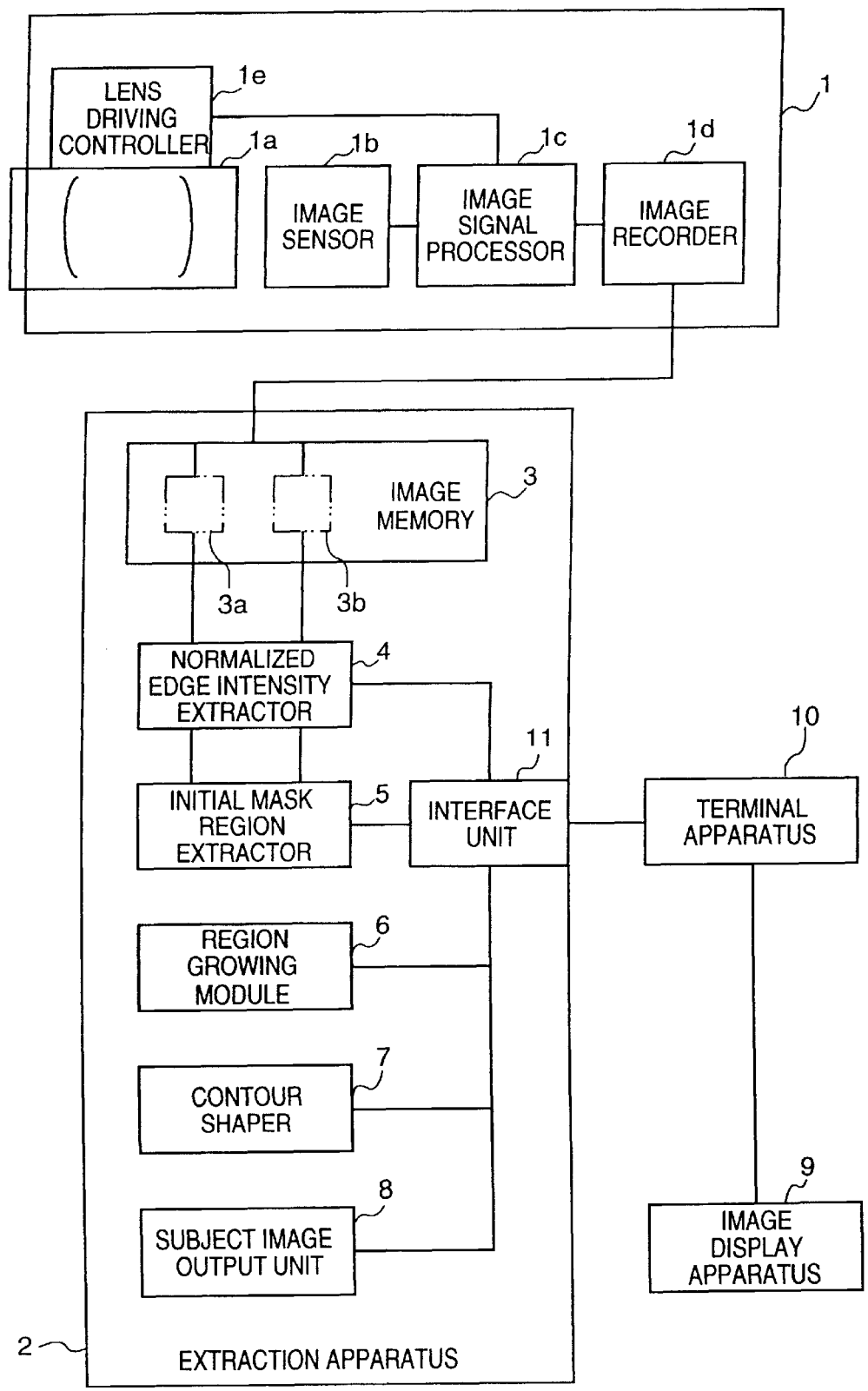
FIG. 1 is a block diagram showing the arrangement of an image sensing system in the first embodiment.

FIG. 1 is a block diagram showing the arrangement of an image sensing system according to the first embodiment. This system is made up of an image sensing apparatus 1, an image extraction apparatus 2, a terminal apparatus 10, and an image display apparatus 9.

The image sensing apparatus 1 comprises, as its major constituting elements, image forming optics $1a$ including a lens, a stop, and a lens driving controller $1e$, an image sensor $1b$, an image signal processor (which performs gamma characteristic control, white balance control, exposure condition control, focusing characteristic control, and the like) $1c$, an image recorder $1d$, and the like.

The image extraction apparatus 2 comprises an image memory 3 including a memory $3a$ for temporarily storing a subject image and a memory $3b$ for temporarily storing a background image, a normalized edge intensity image extractor 4 for calculating the edge intensity of an image, and normalizing the calculated edge intensity, an initial mask extractor 5 for initially generating a mask region for detecting a subject region, a region growing module 6 for growing the initial mask region to an appropriate one, a contour shaper 7 for shaping the contour of the mask region, a subject image output unit 8 for outputting the extracted image of a subject, an interface unit 11, and the like.

The extraction apparatus 2 is connected to the image display apparatus 9 such as a CRT and the terminal apparatus 10 such as a personal computer.

Figure 2:
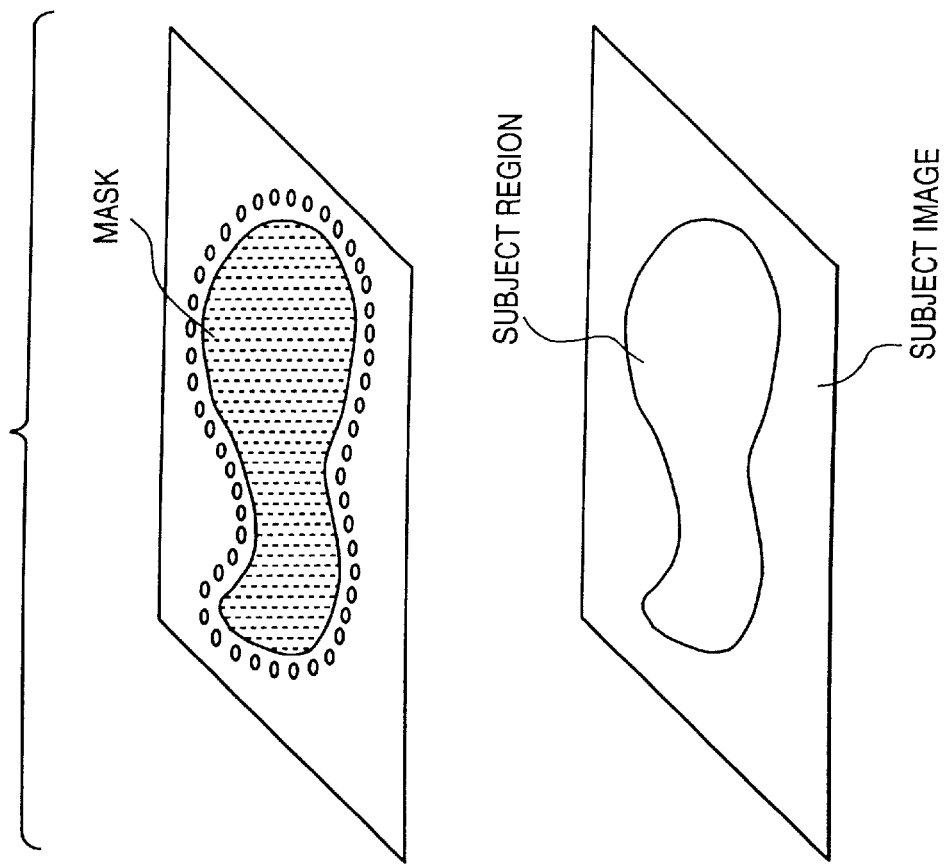
FIG. 2 is a view for explaining the relationship between a mask and subject image.

This system extracts a subject region including a subject alone from an image including both the background and the subject (to be referred to as a subject image hereinafter), and displays the extracted region on, e.g., the display apparatus 9. Upon extracting the subject region, a mask is applied to the subject image. The mask is a set of binary data, which have "1" at positions corresponding to the subject region, and have "0" at other positions, as shown in FIG. 2. The mask is generated by the edge intensity extractor 4, the initial mask extractor 5, and the region growing module 6 shown in FIG. 1. The edge intensity extractor 4 and the initial mask extractor 5 generate an "initial mask", and the region growing module 6 and the contour shaper 7 grow the initial mask to improve it to a mask that matches the subject. The subject image output unit 8 applies the improved mask to the subject image (the image including both the subject and background), and outputs image data at pixel positions of the subject image corresponding to mask values "1", thereby outputting an image of the subject region alone.

Figure 3:
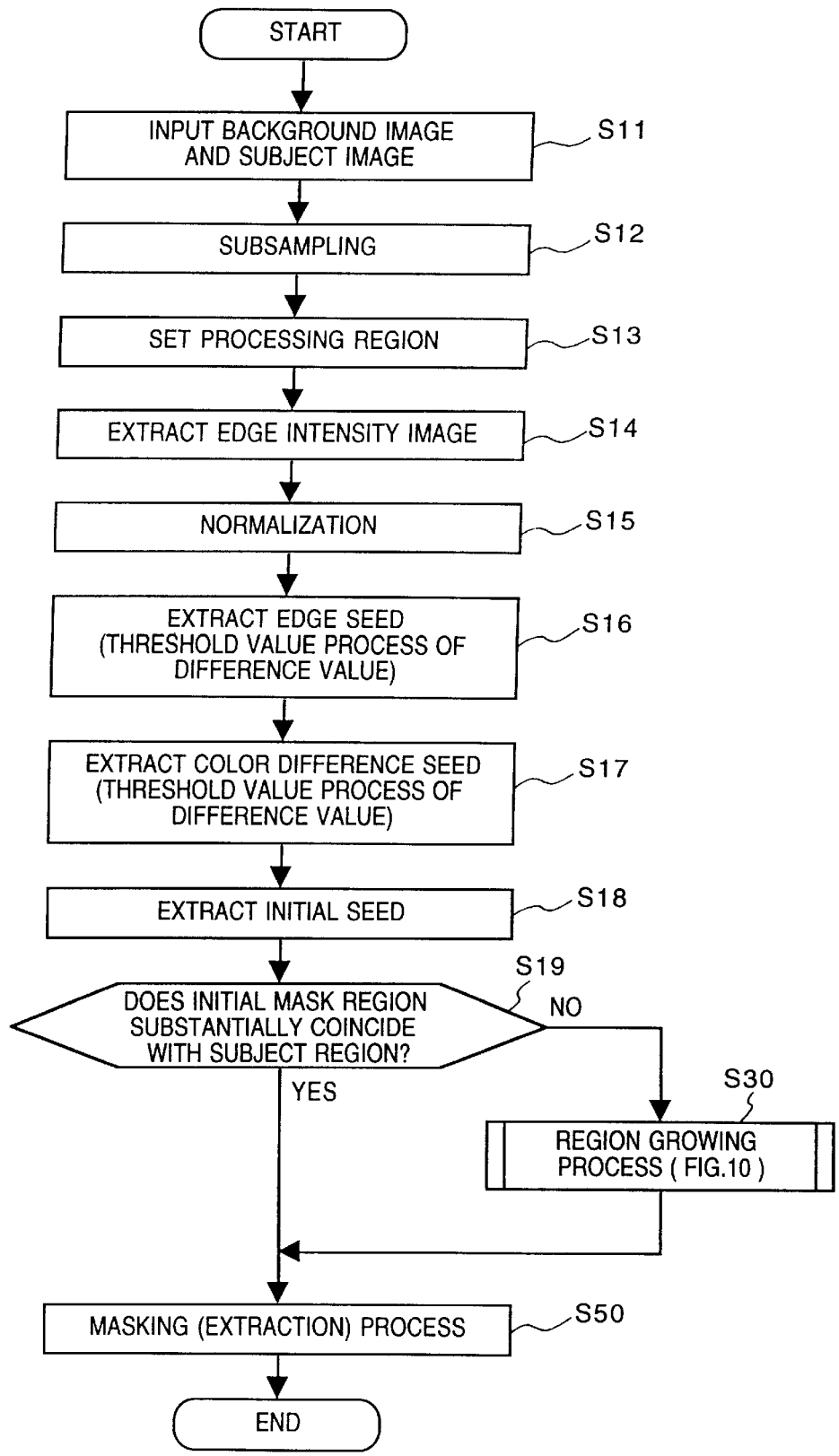
FIG. 3 is a flow chart showing the subject extraction process sequence of the first embodiment.

Note that the extraction apparatus 2 may be constituted by hardware shown in FIG. 1, but may be constituted by gate arrays, or the hardware functions of the apparatus may be implemented by a program software process (e.g., the flow chart in FIG. 3).

The image extraction apparatus of this embodiment is characterized by its individual functions and a combination thereof rather than the hardware arrangement. Accordingly, the functions of the apparatus will be explained with reference to the flow chart since a description using the flow chart allows easier understanding.

FIG. 3 is a flow chart showing the overall subject extraction process sequence.

In steps S12 to S18 in FIG. 3, a mask for subject region extraction is initially generated, and in step S19, it is checked if the generated mask matches the subject region. In step S30, the region of the mask is grown to improve the mask to an appropriate one if the generated mask does not match the subject region. In step S50, the subject region is extracted using the finally completed mask, and a subject image is output.

The process sequence of FIG. 3 will be described in turn below.

Mask Generation

Steps S11 to S18 correspond to the mask generation procedure.

Figure 4A:
FIGS. 4A and 4B show pictures of halftone images that respectively represent a subject image and background image.
Figure 4B:
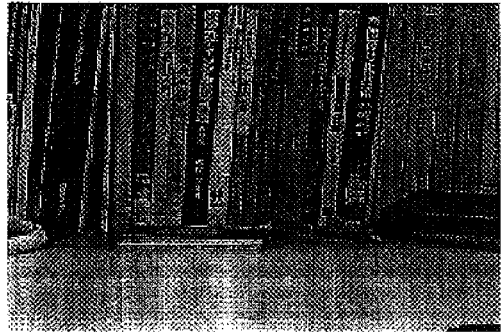

In step S11, a background image and a subject image (including the background) are input from the image sensing apparatus 1. FIG. 4A shows an example of the subject image, and FIG. 4B shows an example of the background image.

In step S12, image data are sub-sampled in accordance with an appropriate reduction factor to increase the processing speed in the subsequent steps. Subsequently, in step S13, the region to be processed, i.e., the region to be subjected to a subject image extraction process, is set on the subject image to include a range where the subject is present. Note that the user may designate the region to be processed using a mouse (not shown) of the terminal apparatus 10 while observing the subject image displayed on the display apparatus 9. The sub-sampling process in step S12, and setting of the processing region in step S13 may be omitted since they are executed to increase the processing speed in the subsequent steps.

In step S14, an edge extraction process is performed for image data of pixels corresponding to the region to be processed set in step S13 in the image data of both the subject image and background image, thereby generating two edge intensity images. The edge intensity images are generated to estimate a boundary using the edge images since the brightness levels or colors sharply change in image data at the boundary between the subject region and background region.

Note that edge extraction may use, in addition to Sobel, Prewitt, Roberts operators, and the like (Mori, Itakura, Basics of Image Recognition (II), Chapter 15, Ohm Corp., 1990), a Canny edge detection operator (*IEEE, Trans. Pattern Analysis and Machine Intelligence*, Vol. PAMI-8, pp. 679–698, 1986), a Marr-Hildreth edge detection operator (*Proc. Royal Society of London*, Vol. B-207, pp. 187–217, 1980), and the like.

Subsequently, in step S15, the edge intensity images obtained in step S14 are normalized. The maximum intensity value of the edge intensity image (the maximum density value of the intensity image) extracted from the subject image can be used as a common factor for normalization, and all the pixel values of the two edge intensity images are divided by this common factor, thereby normalizing the two edge intensity images.

However, a different normalization technique can be used for a subject image which includes many edges that define the boundary between the subject and background, i.e., a subject image having a dense distribution of contour lines (for example, a flower has many relatively fine partial shapes, and its image has many edges; an image having many edges will be referred to as an "edge-rich" image hereinafter). More specifically, blocks each having a predetermined size are set to have individual pixels of the edge intensity image of the subject as centers, and the edge intensity value of a pixel having the maximum value in a block including a certain pixel is replaced by the intensity value of the certain pixel. This manipulation is performed for all the pixels of the edge intensity image to attain normalization.

As another normalization technique, it is effective to use maximum intensity values in the entire images (or local images) of the edge intensity subject image and edge intensity background image as normalization denominators for the respective images since the influence of variations in image sensing condition can be minimized.

Figure 5A:
FIGS. 5A and 5B show pictures of halftone images that represent principal intermediate results of the subject extraction process.
Figure 5B:
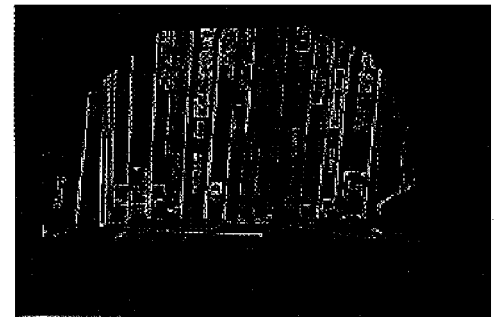

FIGS. 5A and 5B respectively show images obtained by normalizing the edge intensity images extracted from the subject image (FIG. 4A) and background image (FIG. 4B) using, e.g., a Sobel operator (these images will be respectively referred to as a "normalized edge intensity subject image $P_{NESi}$" and a "normalized edge intensity background image $P_{NEBi}$" hereinafter).

In step S16, an "edge seed" extraction process is performed from the normalized edge intensity background image and normalized edge intensity subject image. Note that the "edge seed" is an image which has a value "1" at a position at which the normalized edge intensity background image and normalized edge intensity subject image have considerably different pixel values, and has a value "0" at a pixel position at which their pixel values are not considerably different from each other. More specifically, the absolute value of the difference between a certain pixel value $P_{NESi}$ in the normalized edge intensity subject image and a pixel value $P_{NEBi}$ in the normalized edge intensity background image at the corresponding pixel position is calculated, and the value of the edge seed is defined at "0" at the pixel position where the absolute value of the difference is smaller than a predetermined threshold value ($\delta_0$); the value of the edge seed is defined at "1" at the pixel position where the absolute value is equal to or larger than the threshold value. More specifically, if PK represents the pixels of the edge seed image, if $|P_{NESi}-P_{NEBi}|<\delta_0$, $PK_i=0$ if $|P_{NESi}-P_{NEBi}|\geq\delta_0$, $Pk_i=1$ (1)

Note that the threshold value $\delta_0$ may be adaptively changed in correspondence with images.

Figure 6:
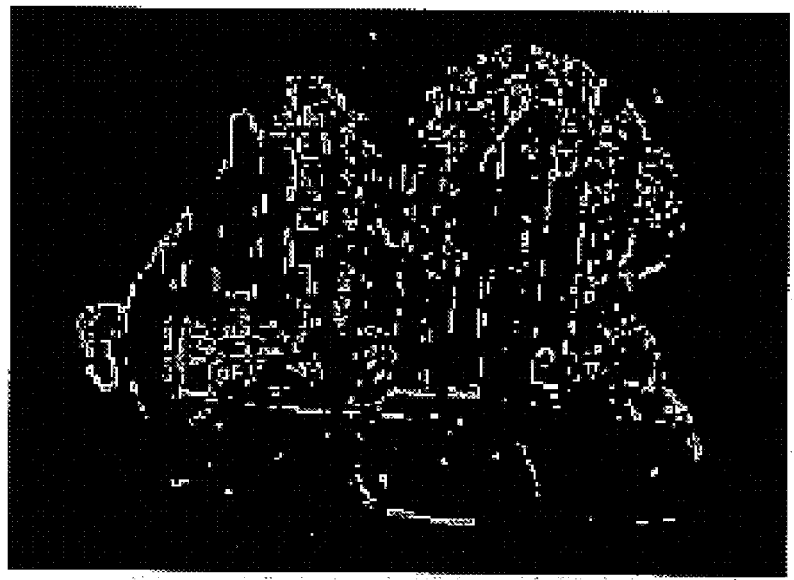
FIG. 6 shows a picture of a halftone image that represents a principal intermediate result of the subject extraction process.

FIG. 6 shows the extracted "edge seed" image. In this manner, the edge seed image represents the difference between the edge intensity images. Hence, as shown in FIG. 6 or 2, the peripheral edge of the "edge seed" image tends to represent the contour of the subject, and its inner portion the edges of the background.

However, since the edge seed image represents brightness edges of image data, it also includes other edges in the original subject image. On the other hand, some edges are erroneously determined as non-edges since they have a small brightness difference from the background image although they originally define the contour of the subject region.

In view of this problem, this embodiment also considers differences ("color difference seed" or "color edge") of color data. In step S17, "color difference seed" extraction is performed.

The differences between the color components (R, G, and B values or hue value) of the background image and subject image in units of pixels are calculated. If $P_b$ represents the pixel value of the background image, $P_s$ represents the pixel value of the subject image, and i represents an arbitrary pixel, the differences between the color components are calculated by:

$$\Delta P_{Ri} = P_{Rbi} - P_{Rsi}$$

$$\Delta P_{Gi} = P_{Gbi} - P_{Gsi}$$

$$\Delta P_{Bi} = P_{Bbi} - P_{Bsi} \quad (2)$$

If $\epsilon_0$ represents the threshold value common to R, G, and B components, the pixel values $P_i$ of all the pixels i that satisfy:

$$\Delta P_{Ri} < \epsilon_0 \text{ and } \Delta P_{Gi} < \epsilon_0 \text{ and } \Delta P_{Bi} < \epsilon_0 \quad (3)$$

are set at:

$$P_i = 0 \quad (4)$$

On the other hand, the pixel values $P_i$ of all pixels that satisfy:

$$\Delta P_{Ri} > \epsilon_0 \text{ and } \Delta P_{Gi} > \epsilon_0 \text{ and } \Delta P_{Bi} > \epsilon_0 \quad (5)$$

are set at:

$$P_i = 1 \quad (6)$$

A binary image generated in this manner is a "color difference seed image".

When a relatively large threshold value $\epsilon_0$ is set in inequalities (3) and (5), the influence of variations in pixel values due to noise and image sensing condition differences can be eliminated, and a light shadow and the like can be removed.

Subsequently, in step S18, an "initial seed" is extracted from the color difference seed (or color edge) detected in step S17 and the edge seed (or luminance edge) detected in step S16. Note that the "initial seed" image is formed by combining the color difference seed and edge seed:

Initial Seed=Color Difference Seed+Edge Seed

Since the initial seed is a binary image of 0s and 1s, it can serve as a mask. A region of "1"s formed by the seed portion will be referred to as a "mask region" hereinafter for the sake of convenience. Since it is initially checked if the initial seed is proper as a mask, "initial" is added to its name. If the initial seed is not proper, a growing process is done based on its "seed".

When the initial seed is edge-rich, a background noise removal process must be additionally performed in the process of combining the color difference seed and edge seed. More specifically, points having pixel values equal to or greater than a predetermined threshold value in the normalized edge intensity background image that corresponds to the mask region formed by the extracted initial seed are removed. FIG. 6A shows the "initial seed (initial mask region)" obtained by this process.

In step S19, it is checked if the initial mask region extracted in step S18 substantially matches the subject region.

Figure 10:
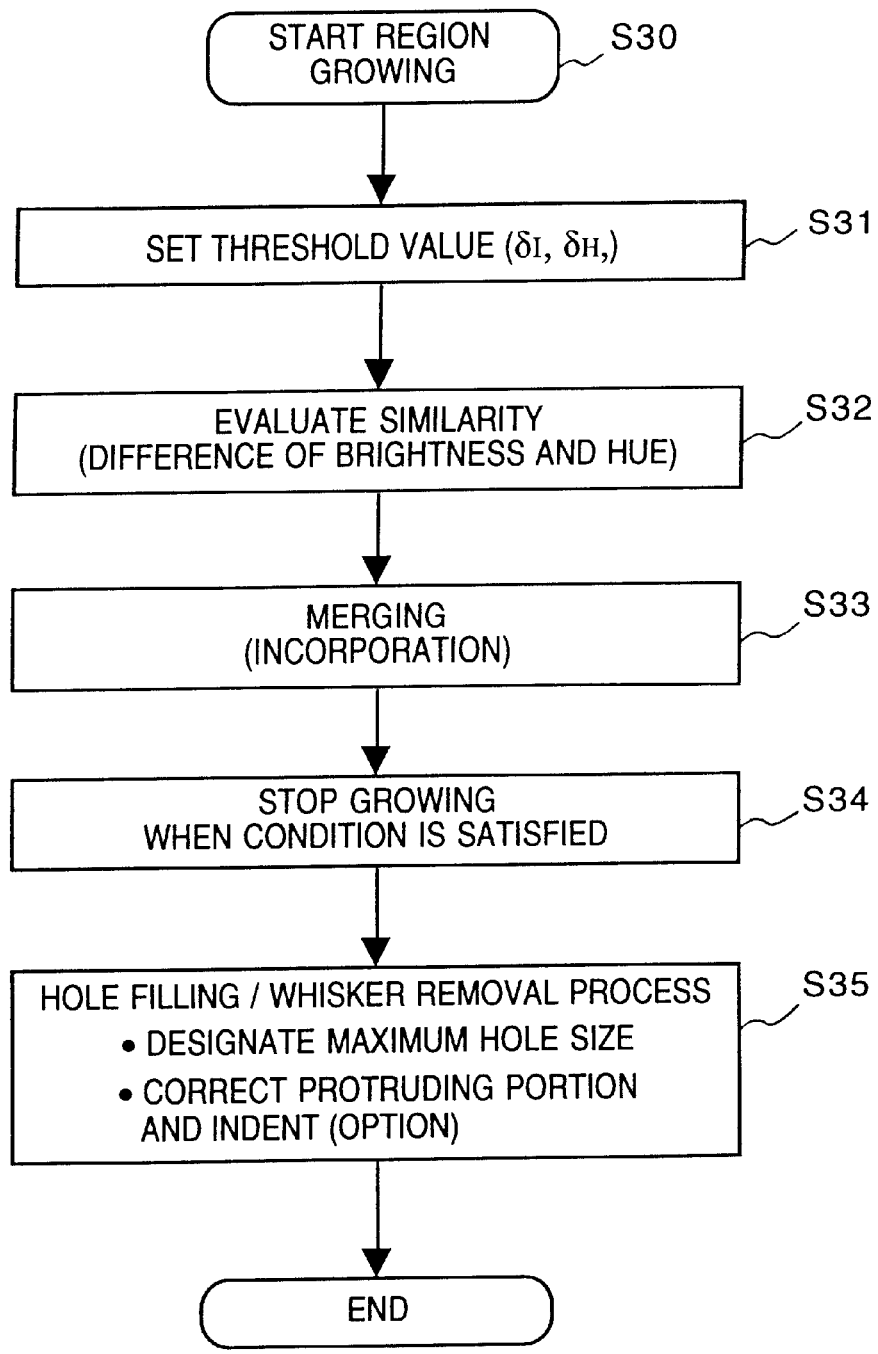
FIG. 10 is a flow chart showing the region growing process sequence in step S30 in FIG. 3.

If the two regions do not match, it is determined that the initial mask set in step S18 is incomplete or is not correct, and the flow advances to step S30 to execute a growing process of the mask region. Note that FIG. 10 shows the details of step S30.

On the other hand, if the two regions substantially match, it is determined that the initial mask is roughly complete, and the subject region is extracted and output using the mask in step S50.

Mask Growing

The process for performing region growing of the initial mask region when it is determined that the initial mask region is incomplete will be described below with reference to the flow chart in FIG. 10.

In this growing process, growing proceeds using the "seed" as the center. That is, a pixel (to be referred to as a pixel of interest hereinafter) on the boundary of seeds in the initial mask region is compared with neighboring pixels (or region), so as to check the similarity between the image features of the pixel of interest and the neighboring pixels. If the similarity is higher than a predetermined threshold value, the neighboring pixels are considered as those in an identical mask region, and are incorporated in this mask region.

In step S31, a difference threshold value $\delta_I$ for brightness and a difference threshold value $\delta_H$ for hue are set as parameters required for checking the similarity for brightness and that for hue.

In step S32, the similarity between the pixel of interest and neighboring pixels is evaluated using the threshold values. In this embodiment, the neighboring pixels include eight neighboring pixels. Whether or not the pixel of interest is similar to the neighboring pixels is determined as follows. That is, the absolute difference values of image data (in units of R, G, and B components) and the absolute difference value of hue values between the pixel of interest and each of the neighboring pixels are calculated. If the difference values of the R, G, and B image data are respectively equal to or smaller than the threshold value $\delta_I$, or if the absolute difference value of hue is equal to or smaller than the threshold value $\delta_H$, it is determined that the pixel of interest and the neighboring pixel have a small difference, i.e., they are similar to each other. More specifically, if one of the two inequalities based on the two threshold values holds, it is determined that the neighboring pixel is a portion of the subject region, and is incorporated in an identical mask region (step S33). That is, if $P_{iD}$ and $P_{iH}$ respectively represent the R, G, and B image data and hue value of the pixel i of interest, and $P_{kD}$ and $P_{kH}$ represent the R, G, and B image data and hue value of a neighboring pixel k, if one of two inequalities below holds, it is determined that the two pixels are similar to each other:

$$|P_{iD} - P_{kD}| < \delta_I \quad (8)$$

$$|P_{iH} - P_{kH}| < \delta_H \quad (9)$$

Figure 11:
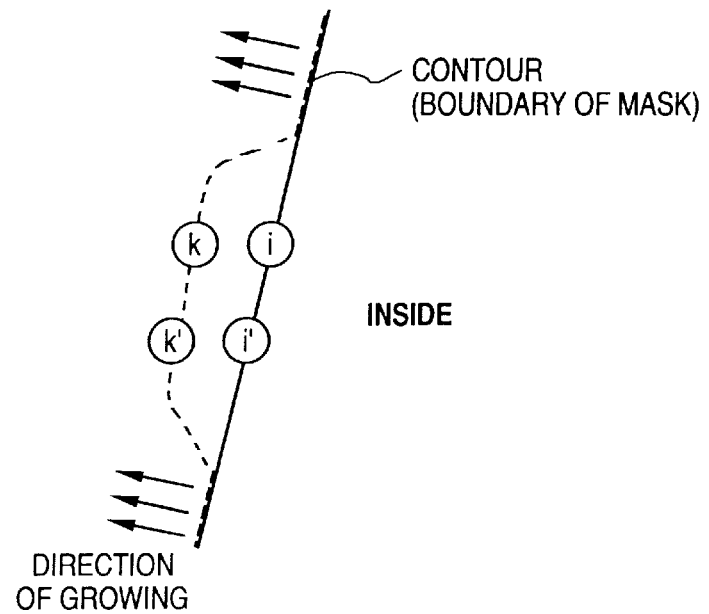
FIG. 11 is a view for explaining the process of region growing of the first embodiment.

The growing process in steps S32 and S33 is performed for all the pixels located at the boundary of the mask by moving the pixel of interest within the initial mask region (i→i', k→k'), as shown in FIG. 11. If the condition in step S34 to be described below is satisfied, the growing process is stopped. The stop condition is that if the region growing process is being done in a certain direction, the density of edge seeds within a predetermined range in that direction is smaller (than a predetermined threshold value). If it is confirmed in step S34 that the condition is satisfied, the growing in that direction is stopped.

Figure 12:
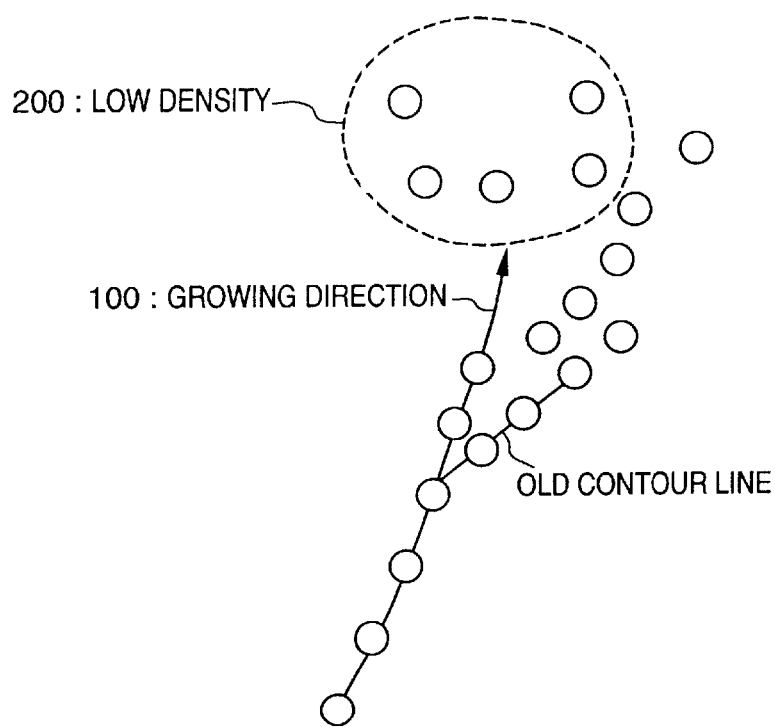
FIG. 12 is a view for explaining the condition for stopping contour growing in the first embodiment.

FIG. 12 shows a result of this step. For example, in a to-be-grown region 200 present in a certain growing direction 100 (the direction is one of eight directions pointing from the pixel of interest toward eight neighboring pixels) in FIG. 12, the region to be processed is set to include in an extent of about 10 pixels from the most neighboring pixel. If the number of edge difference seeds in the region 200 to be processed is two or less (i.e., no edge difference seed, or one or two edge seeds are present), and the similarity between the most neighboring pixel and the pixel of interest satisfies the growing condition, it is determined that the region need not be grown in that direction and the region up to the most neighboring pixel is sufficient, thus stopping the subsequent growing.

Note that whether or not the image to be processed is an edge-rich image may be determined, and such growing stop function may be automatically effected if it is determined that an edge-rich image is to be processed, or such-function may be added depending on the user's decision.

Figure 7A:
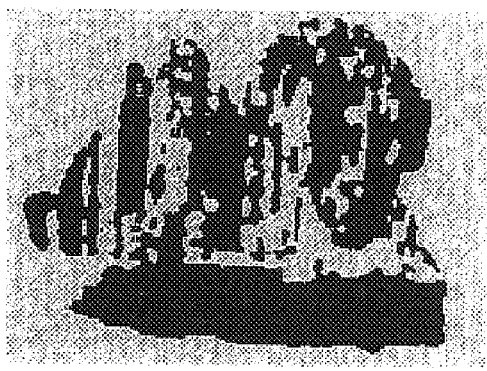
FIGS. 7A and 7B show pictures of halftone images that represent principal intermediate results of the subject extraction process.
Figure 7B:
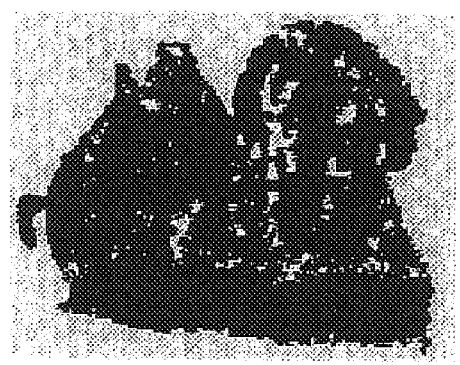

FIG. 7B shows the grown mask region. The region growing process of this embodiment can be understood from comparison between FIGS. 7A and 7B.

Subsequently, in step S35, a hole filling process for filling "holes" which may potentially exist in the grown region is executed. Such holes also exist in a non-grown portion after the region growing process. The maximum size of the hole to be filled may be input in advance to the system of this embodiment, or the user may determine it based on the region growing result.

Figure 8A:
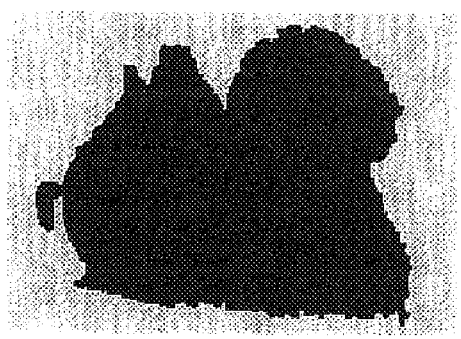
FIGS. 8A and 8B show pictures of halftone images that represent principal intermediate results of the subject extraction process.

FIG. 8A shows an example of the mask region that has been subjected to the hole filling process. In step S35, a "whisker" removal process or indent correction process for correcting any indent of the contour may be added as an option in addition to the hole filling process.

Figure 8B:
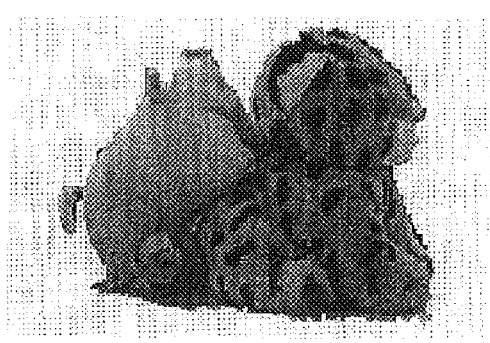

FIG. 8B shows an example of the intermediate extracted image.

Contour Shaping

If the user determines that the contour shape of the subject is incomplete in the mask region subjected to the process up to step S35, a contour shaping process is performed.

Figure 13:
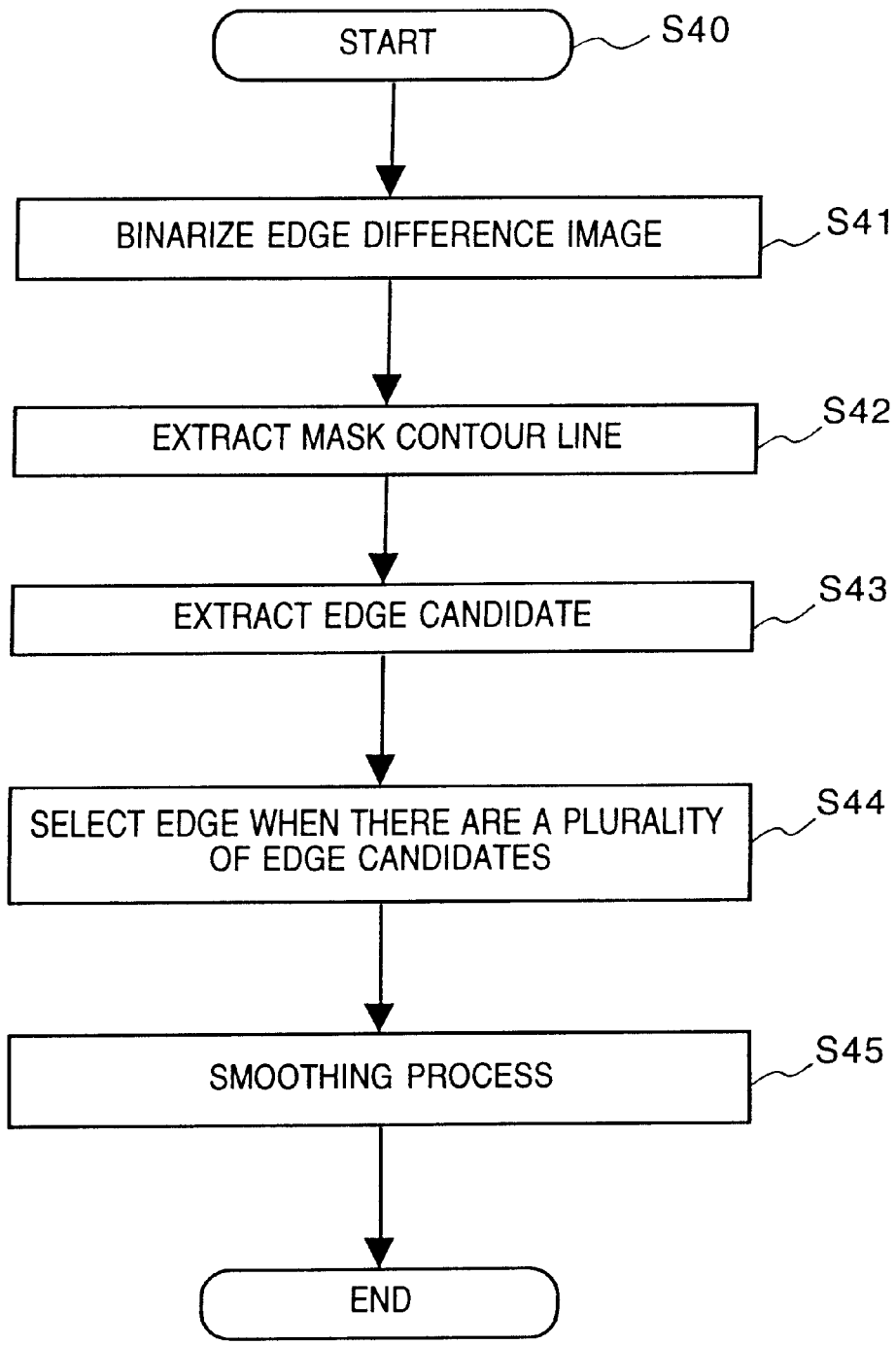
FIG. 13 is a flow chart showing the contour shaping process sequence in the first embodiment.

FIG. 13 is a flow chart showing the contour shaping process sequence. The objective of this process is to stably extract the subject region with a correct shape independently of the contour pattern present in neighboring region of the boundary between the subject image and the background image. To attain this objective, the contour shaping process sequence uses difference data between the normalized edge intensity distributions of both the subject image and background image (see step S16).

The second objective of the contour shaping process is to avoid an edge selection process (step S44; to be described later) from being influenced by the edge pattern of the background present inside the edge-seed image (as in the difference edge seed extraction in step S16) to disturb correct subject contour extraction. To attain this objective, the background edge image is subtracted from the subject edge image to calculate an edge intensity value, and points (or a region) having a negative edge intensity value are removed from the difference edge data. However, the above-mentioned objectives may be ignored, and the same process as that to be described below may be executed using the edge intensity data of the subject image.

Figure 14:
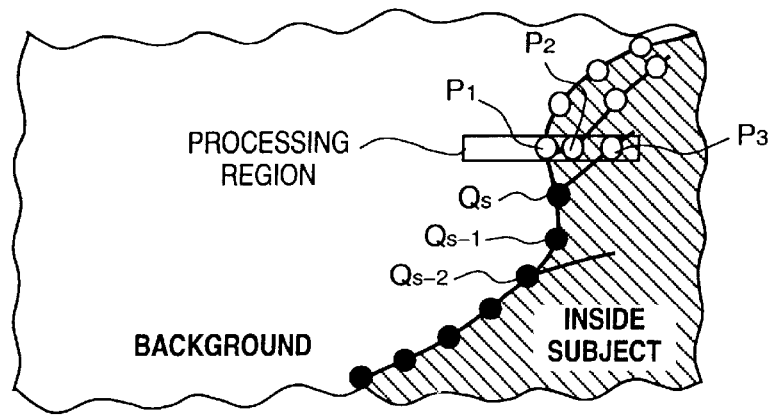
FIG. 14 is an explanatory view showing the edge selection process of the first embodiment.

More specifically, as shown in FIG. 14, the contour shaping process searches for one edge point that makes up an accurate contour line from edge candidates $P_1$, $P_2$, and $P_3$ that form an incomplete contour line.

The contents of the contour shaping process will be described in detail below.

In step S41, pixels at which the difference data between the normalized edge intensity subject image and the normalized edge intensity background image is equal to or smaller than a predetermined threshold value (for the threshold value>0) are removed to leave only reliable subject edge data.

In step S42, the contour line of the grown mask region is traced to detect the tracing direction.

In step S43, at each point on the contour line, the region to be subjected to the shaping process (see FIG. 14) is set in a direction perpendicular to the detected contour tracing direction (the tracing direction is defined so that the right-hand side of the tracing direction is always in the subject region). Data representing the traced contour line is expressed as a function of the tracing path length (arc length s) (a length x(s) in the x-direction, and a length y(s) in the y-direction) and, for example it is a set of edge points. The path length to the pixel edge of interest is expressed by x(s) and y(s). Edge candidates that should form a corrected contour line are searched for from the region to be processed (see FIG. 14) set by the process in step S43.

If there are a plurality of edge points serving as candidates, an edge selection process is performed in step S44.

FIG. 14 explains the edge selection process in step S44. In FIG. 14, points $Q_{s-2}$, $Q_{s-1}$, $Q_s$, and the like indicated by full circles are those already selected by the edge selection process executed so far, and points $P_1$, $P_2$, $P_3$, and the like indicated by open circles are edge candidates to be selected in the current selection process. The processing region includes points to be subjected to edge selection, and is set in a direction perpendicular to the contour tracing direction, as described above.

Determination of a correct edge line, i.e., edge selection is attained based on evaluation of the continuity of pixel values (R, G, and B values) and evaluation of shape continuity. More specifically, evaluation of the continuity of pixel values discriminates feature continuity $C_c$ (continuity of R, G, and B values) between an edge candidate (open circle point) and the subject edge, and evaluation of the shape continuity discriminates continuity $C_s$ of the contour shape. More specifically, an energy function F as a sum of the two quantities $C_c$ and $C_s$ that represent the continuities is set, and an edge candidate having a small energy function F value is selected, so that the selected edges make up a correct contour line.

In this embodiment, the feature continuity $C_c$ is expressed by drifts (values between inner neighboring pixels), in the contour tracing direction, of R, G, and B features of an edge candidate on the subject side on a contour line including the edge candidate (assume that this contour line is made up of four pixels including three already selected edge pixels ($Q_{s-2}$, $Q_{s-1}$, and $Q_s$ in FIG. 14) and the edge candidate to be connected thereto (one of $P_1$, $P_2$, and $P_3$), and is defined by:

$$C_c = \frac{dR}{MR} + \frac{dG}{MG} + \frac{dB}{MB} \qquad (10)$$

where dR, dG, and dB are the differences of R, G, and B components between an unknown edge candidate $P_x$ and, e.g., two edge points $Q_s$ and $Q_{s-1}$ already determined as a contour. More specifically, dR, dG, and dB are respectively given by:

$dR = \Delta R_0 + \Delta R_1$ $dG = \Delta G_0 + \Delta G_1$ $dB = \Delta B_0 + \Delta B_1$ where $\Delta R_0$ denotes variance of R value between points $P_x$ and $Q_s$, $\Delta R_1$ denotes variance of R value between points $P_x$ and $Q_{s-1}$. Similar notations are applied to $\Delta G_0$, $\Delta G_1$, $\Delta B_0$, and $\Delta B_1$. Also, MR, MG, and MB are the maximum differences of R, G, and B components (differences between maximum and minimum values) between an unknown edge candidate $P_x$ and the edge points $Q_s$ and $Q_{s-1}$. As shown in equation (10), since dR, dG, and dB are respectively divided by MR, MG, and MB, $C_c$ represents a sum total of the normalized differences of R, G, and B components. However, such normalization process is not a necessary condition for evaluating the feature continuity.

An evaluation function $C_s$ of the shape continuity evaluates using the curvature of the contour line in a local region including an edge candidate. The contour line is expressed by the arc length s. Since the curvature of the contour line is expressed by second derivatives $x_{ss}$ and $y_{ss}$ of the coordinate values x and y of pixels on the contour for s, the evaluation function $C_s$ is:

$$C_s = \sqrt{x_{ss}+y_{ss}} \tag{11}$$

for $$x_{ss}=d^2x/ds^2, y_{ss}=d^2y/ds^2$$

Figure 16:
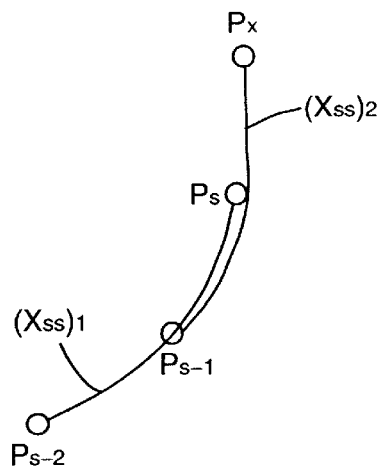
FIG. 16 is a view for explaining the processing principle of shape continuity evaluation in the first embodiment.

FIG. 16 shows the concept of the evaluation function $C_s$. To obtain a second derivative, three edge points are required. Equation (11) represents:

$$\text{a curvature } (C_s)_1 = \left(\sqrt{x_{ss}+y_{ss}}\right)_1, \text{ or}$$

$$\text{a curvature } (C_s)_2 = \left(\sqrt{x_{ss}+y_{ss}}\right)_2.$$

Hence, to maintain the continuity of the curvature is to select an edge candidate $P_i$ that satisfies $(C_s)_1 \cong (C_s)_2$.

Note that $C_s$ may be given by a first derivative associated with a contour line sampling point sequence including an edge candidate of contour line data. When equation (11) is discretized using selected and non-selected data, $C_s$ is given by the following equation (12):

$$S = \sqrt{(e_x - 3 \cdot E_x(s) + 3 \cdot E_x(s-1) - E_x(s-2))^2 + (e_y - 3 \cdot E_y(s) + 3 \cdot E_y(s-1) - E_y(s-2))^2} \tag{12}$$

where $E_x(s)$ and $E_y(s)$ are the already determined contour line data (or as already set initial values), and $e_x$ and $e_y$ are the x- and y-coordinates of each edge candidate (i.e., one of points $P_1$, $P_2$, and $P_3$). If the contour tracing direction is assumed to be the upper or lower direction (y-direction), since the search region of the edge candidates is set in a direction perpendicular to the tracing direction, $e_x$ component is the edge candidate coordinate value to be determined (if the tracing direction is the right or left direction, $e_y$ becomes a variable factor).

The energy function F is given by:

$$F=C_c+a \cdot C_s \tag{13}$$

where a is a factor that serves as a weighting coefficient between $C_c$ and $C_s$ ($0 \leq a \leq 1$), and can be considered as a kind of regularization parameter in the regularization process. The weighting coefficient a can be appropriately selected by the user.

On the other hand, if no edge candidate is present in the local region set in step S43, i.e., no edge candidate having high reliability is present, a contour point on the mask or a predicted edge position in the contour tracing direction (for example, if the tracing direction is the upper direction, a point obtained by increasing the y-coordinate value by one pixel while fixing the x-coordinate may be selected) is selected as an edge candidate point, and a point having an energy function with a lower evaluated value is selected or a point on boundary of the mask is determined as the selected edge.

After the edge selection process in step S44, a mask data smoothing process is done in step S45. In this step, median filter processes to the contour data (one-dimensional) and two-dimensional mask data are performed. With this process, when the above-mentioned edge selection process (step S44) results in a still incomplete partial shape (e.g., when a discontinuous uneven portion or dither pattern remains in the vicinity of the subject contour line as a result of the process with no highly reliable edge candidates), such portion can be smoothed to improve the degree of approximation of the subject contour shape.

Note that the median filter process may be recursively applied. Needless to say, the smoothing filtering process is not limited to the median filter.

A subject image masked by executing the masking process based on mask data obtained by the contour shaping process (step S40) is output (step S50 in FIG. 3), and the result is output to the image display apparatus 9 or a printer as the subject image output unit 8.

Figure 9:
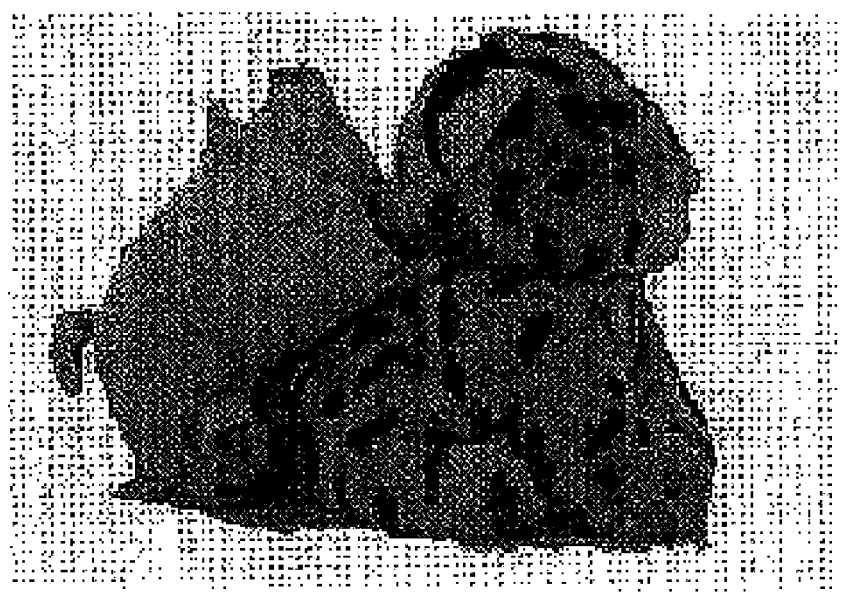
FIG. 9 shows a picture of a halftone image that represents the result of the subject extraction process.

FIG. 9 shows the subject image.

<Modification of First Embodiment>

The control procedure shown in FIGS. 3, 10, and 13 can be variously modified.

For example, in step S18 in FIG. 3, if the initial seed image is an edge-rich image in the combining process of the color difference seed image and edge seed image, the background image removal process need be done. More specifically, points, which have pixel values equal to or larger than a predetermined threshold value, in the normalized edge intensity background image corresponding to the mask region formed by the temporarily extracted initial seed image are removed.

On the other hand, the initial mask region extraction process is not limited to the above-mentioned procedure (steps S15 to S18 in FIG. 3). For example, the initial mask region may be extracted by executing a thresholding process of statistic parameters such as correlation coefficients among blocks each of which is defined to have each pixel as the center and has a predetermined size, or average values or standard deviations of pixel values in each block, and the like.

Note that the image sensing system of the first embodiment is premised on the fact that image sensing is made while the image sensing apparatus 1 is fixed to, e.g., a tripod, or image sensing is made while the exposure condition or focusing is not automatically set. If, in the apparatus of the first embodiment, image sensing is made in the hand-held state, or the background and subject images are sensed while automatically setting the exposure condition and focusing, the background and subject images must be aligned. This alignment or position adjustment is attained by executing the process of the third embodiment (steps S114 and S115; to be described later).

<Second Embodiment>

The image sensing system in the second embodiment applies the techniques of the first embodiment to the initial mask region extraction and region growing process, but executes a contour shaping process using an "active contour model method" (M. Kass et al., "Snakes: Active Contour Models", *International Journal of Computer Vision*, vol. 1, pp. 321–331, 1987).

The active contour process is to move and deform initial contours to minimize evaluation functions to be described later, and to finally converge the initial contours to the outline or its envelope of the object. In the second embodiment, an active contour shaping process (step S400) is performed for a mask image (data having values "0"s and "1"s), and the contour shaping process of the first embodiment (step S40) is performed for a subject image.

Figure 17:
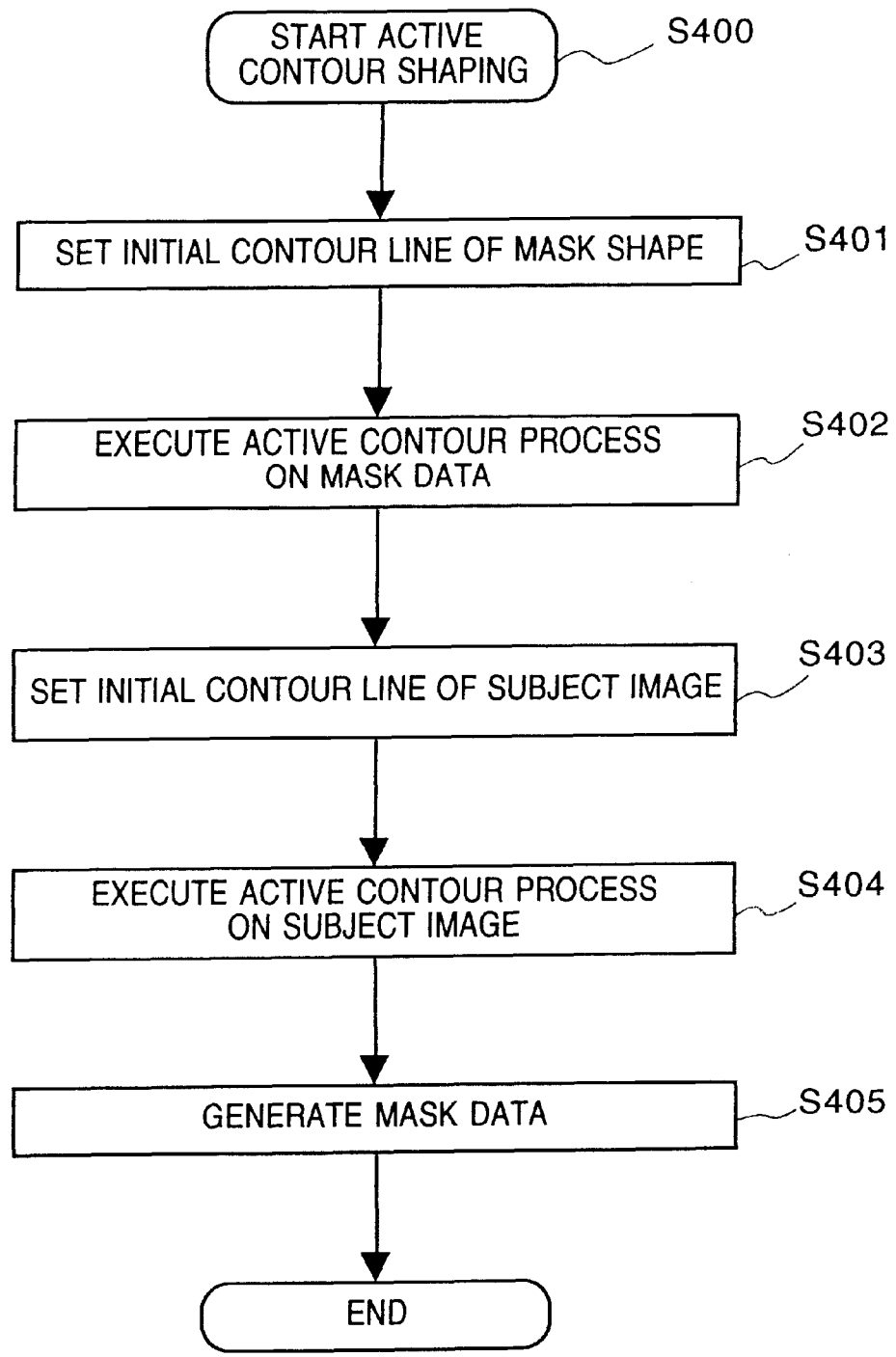
FIG. 17 is a flow chart showing the active contour shaping process sequence according to the second embodiment.

FIG. 17 is a flow chart showing the procedure of the active contour shaping process.

The active contour shaping process uses, as the start point, a mask region obtained by executing the same initial mask region extraction process (steps S15 to S18) and region growing process (steps S31 to S35) as those in the first embodiment.

More specifically, in step S401 in FIG. 17, an "initial contour line" is set on the basis of the obtained mask region.

Figure 18:
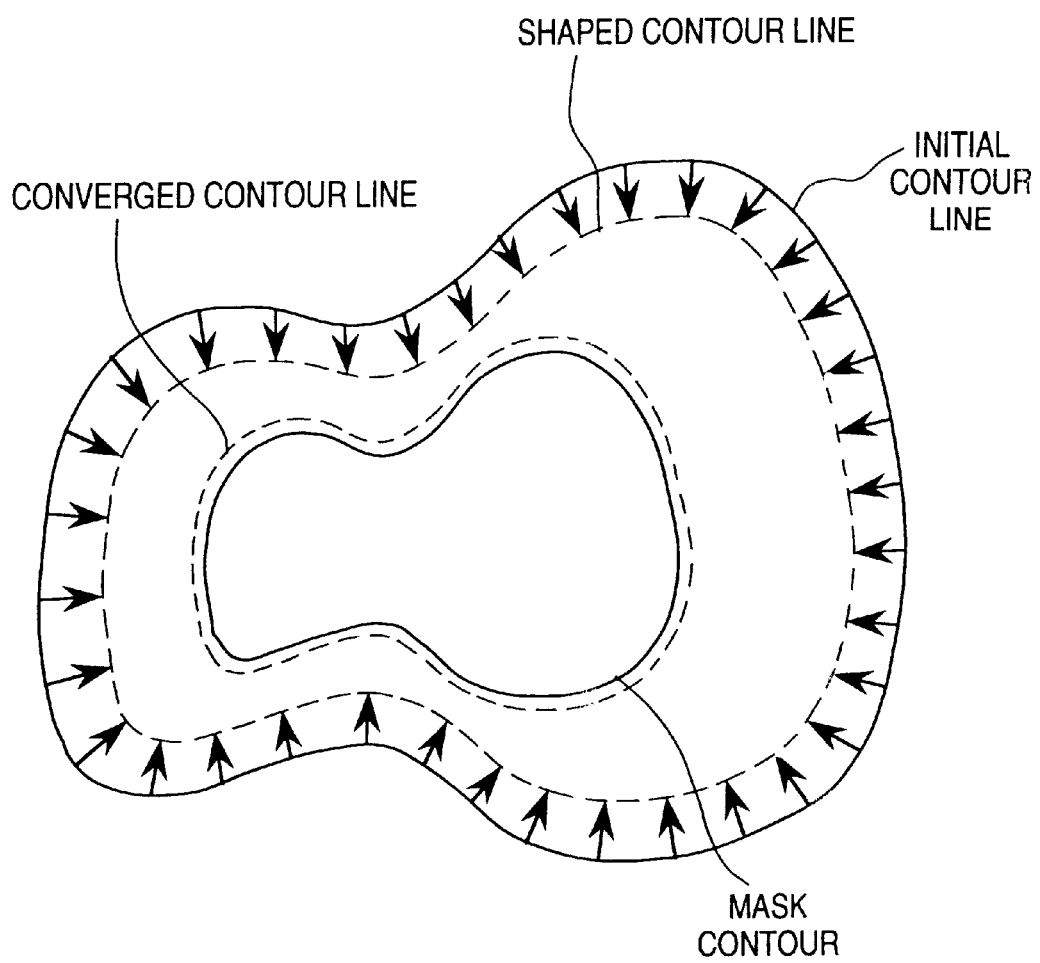
FIG. 18 is a view for explaining the operation of the active contour shaping process.

This "initial contour line" is the one that serves as the starting point of the active contour process, and is set by enlarging the boundary line of the mask region to a predetermined magnification factor to have the centroid of the mask region as the center or is set around the mask region using a pointing/selection device such as a mouse or the like. Since an evaluation function E to be described later is conditioned to shrink the contours after the contours are subjected to the process, the "initial contour lines" are set to be larger than the mask, as shown in FIG. 18.

In step S400, the active contour process to be described below is done on the mask data which is binary in luminance level. More specifically, a contour line shape v(s) is calculated by minimizing the value of the evaluation function E given by equations (14) below with respect to a contour line v(s)=(x(s), y(s)) expressed using a parameter s (typically, an arc length s) that describes the coordinates of the individual points on the contour:

$$E = \int_0^u (E_1(v(s)) + w_0 \cdot E_0(v(s))ds \quad (14)$$

$$E_1(v(s)) = \alpha(s)\left|\frac{dv}{ds}\right|^2 + \beta(s)\left|\frac{d^2v}{ds^2}\right|^2$$

$$E_0(v(s)) = -|\Delta I(v(s))|^2$$

where $I(v(s))$ is the luminance level on $v(s)$, $\nabla$ is the differential operator, and $\alpha(s)$, $\beta(s)$, and $w_0$ are appropriately selected by the user.

In step S402, the active contour process is recursively performed for the contour line shape v(s). That is, after a contour line shape v(s) is obtained by performing the process for minimizing the evaluation function E given by equations (14) once, the active contour process is recursively done for the obtained contour line shape v(s) to time-serially and sequentially deform and/or move the contour v(s).

Each recursive step of the active contour process is processed by selecting a point that minimizes the function E from a set of points (a neighboring region defined in advance) within the movable range at each point on the contour line v(s) or by solving Euler equations of the contour v(s) that minimizes the evaluation function E using the calculus of variation.

Executing the active contour process on the contour lines of the mask data is to prevent the contour lines from erroneously converging to the background pattern (which is present in the vicinity of the subject on the subject image) and to allow smoothing of the mask shape after region growing and correction of the contour shape of the non-grown region. Especially, as the correction function, the active contour process is effective when a smooth, continuous shape corresponding to a subjective contour line is generated to compensate for a lost portion of the shape.

In many cases, the contour shape v(s) of the mask after the evaluation function E (equations (14)) converges to a minimum value is considered as sufficiently close to the subject shape.

In step S403, the contour shape after convergence is set as the "initial contour line" of the subject image region. That is, the contour line obtained for the obtained mask in steps S401 and S402 is applied to the subject image. To attain this, in step S404, the active contour process (equations (14)) is applied to the contour of the subject image in the same manner as in the active contour shaping process of the mask, thereby enlarging the contour of the subject region of the subject image.

In step S405, the interior of the finally converged contour is extracted and is set as the mask region.

<Modification of Second Embodiment>

In the second embodiment, not all the steps of the process shown in FIG. 17 are always indispensable.

More specifically, the active contour process on the mask data in step S402 is sometimes not indispensable, and in such case, steps S402 and S403 may be omitted.

Upon setting the "initial contour line" in step S401, the initial mask obtained by the process shown in FIG. 3 may be directly used without executing any region growing process (FIG. 10). When the processes are modified in this manner, the roughly converged contour shape is further subjected to the contour shaping process on the subject image to extract the shape of details. Depending on the particular conditions involved, after the initial mask region is extracted, the active contour process may be performed on the subject image.

<Third Embodiment>

The third embodiment is characterized by using a threshold value whose value is distributed in correspondence with the subject image in region growing.

Figure 19:
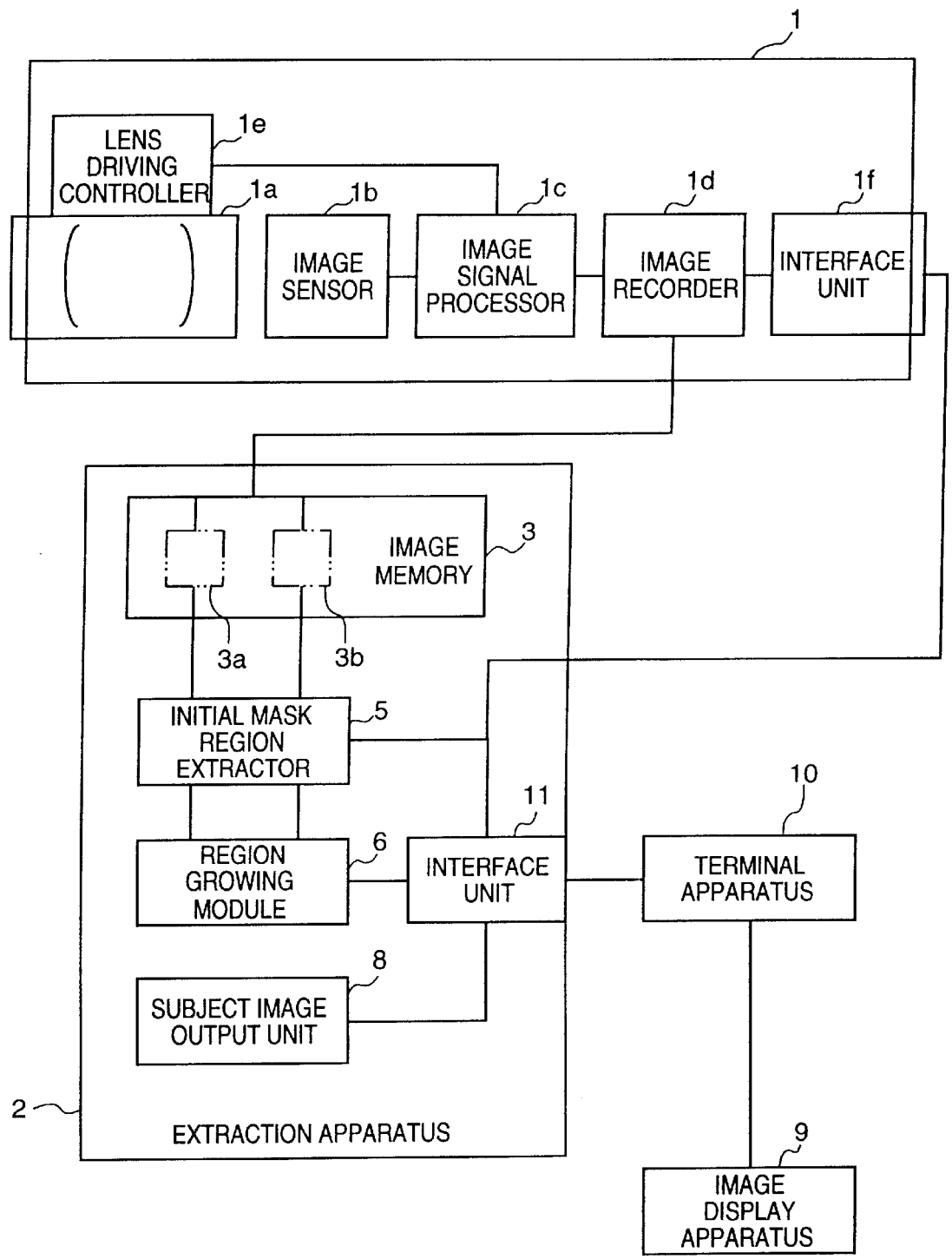
FIG. 19 is a block diagram showing the arrangement of an image sensing system in the third embodiment.

FIG. 19 is a block diagram showing the arrangement of an image sensing system according to the third embodiment. In the third embodiment, two images, i.e., a subject image and a background image excluding the subject are used as input images as in the first embodiment.

An image sensing apparatus 1 comprises, as its major constituting elements, image forming optics 1a including a lens, a stop, and a lens driving controller 1e, an image sensor 1b, an image signal processor (which performs gamma characteristic control, white balance control, exposure condition control, focusing characteristic control, and the like) 1c, an image recorder 1d, an interface unit 1f, and the like.

An extraction apparatus 2 comprises an image memory 3 including memories 3a and 3b, an initial mask region extractor 5 for extracting the prototype of a mask used for extracting the subject region, a growing module 6 for growing an initial mask region, and a subject image output unit 8 for outputting the subject image extracted using the grown mask. The extraction apparatus 2 is connected to an image display apparatus 9, a terminal apparatus 10, and an interface unit 11 for interfacing the image memory 3, the initial mask region extractor 5, the growing module 6, the object image output unit 8 the terminal 10, and the like to each other, and the like, as in the first embodiment.

Figure 20A:
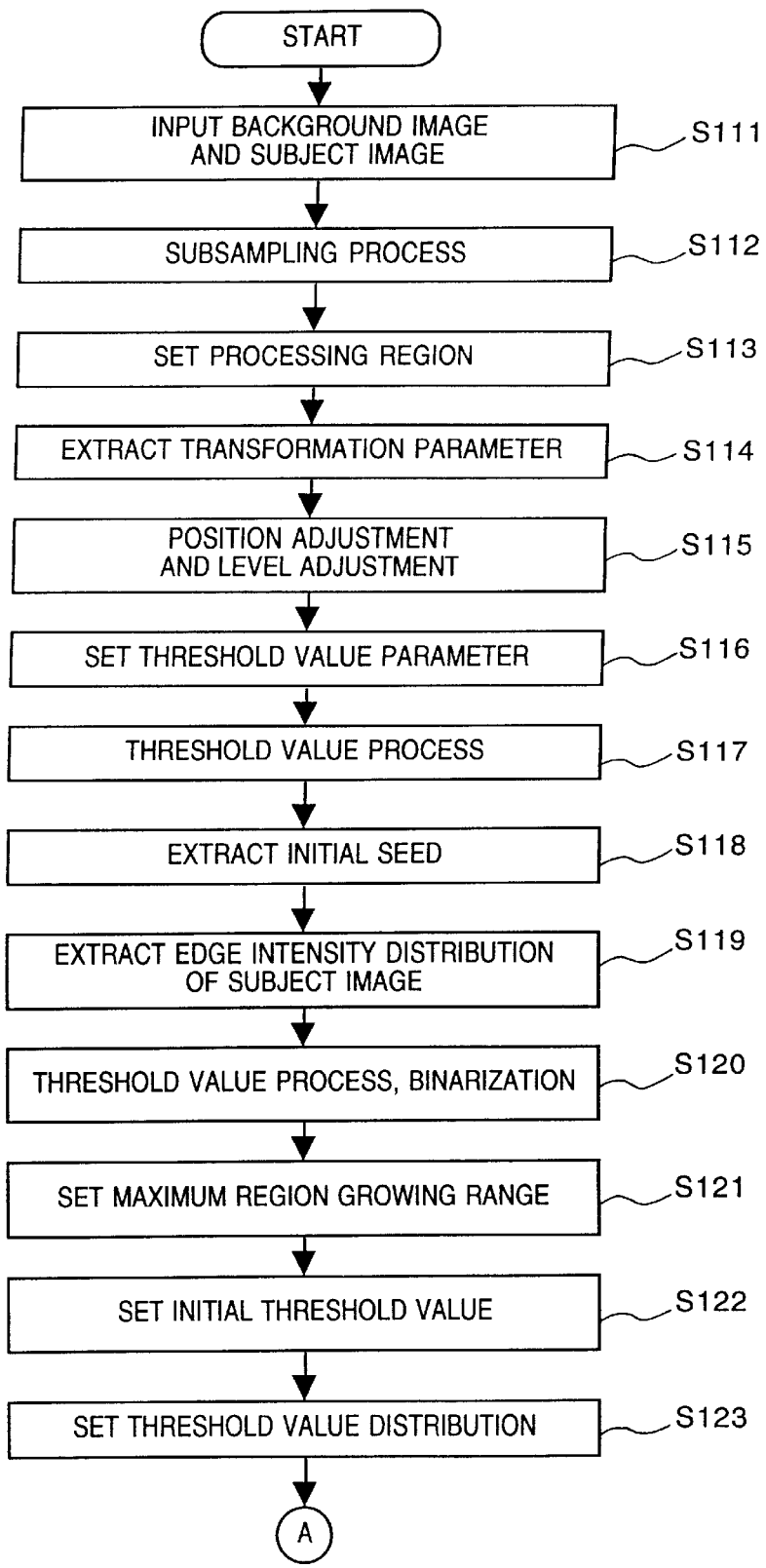
FIGS. 20A and 20B are flow charts showing the subject extraction process sequence of the third embodiment.
Figure 20B:
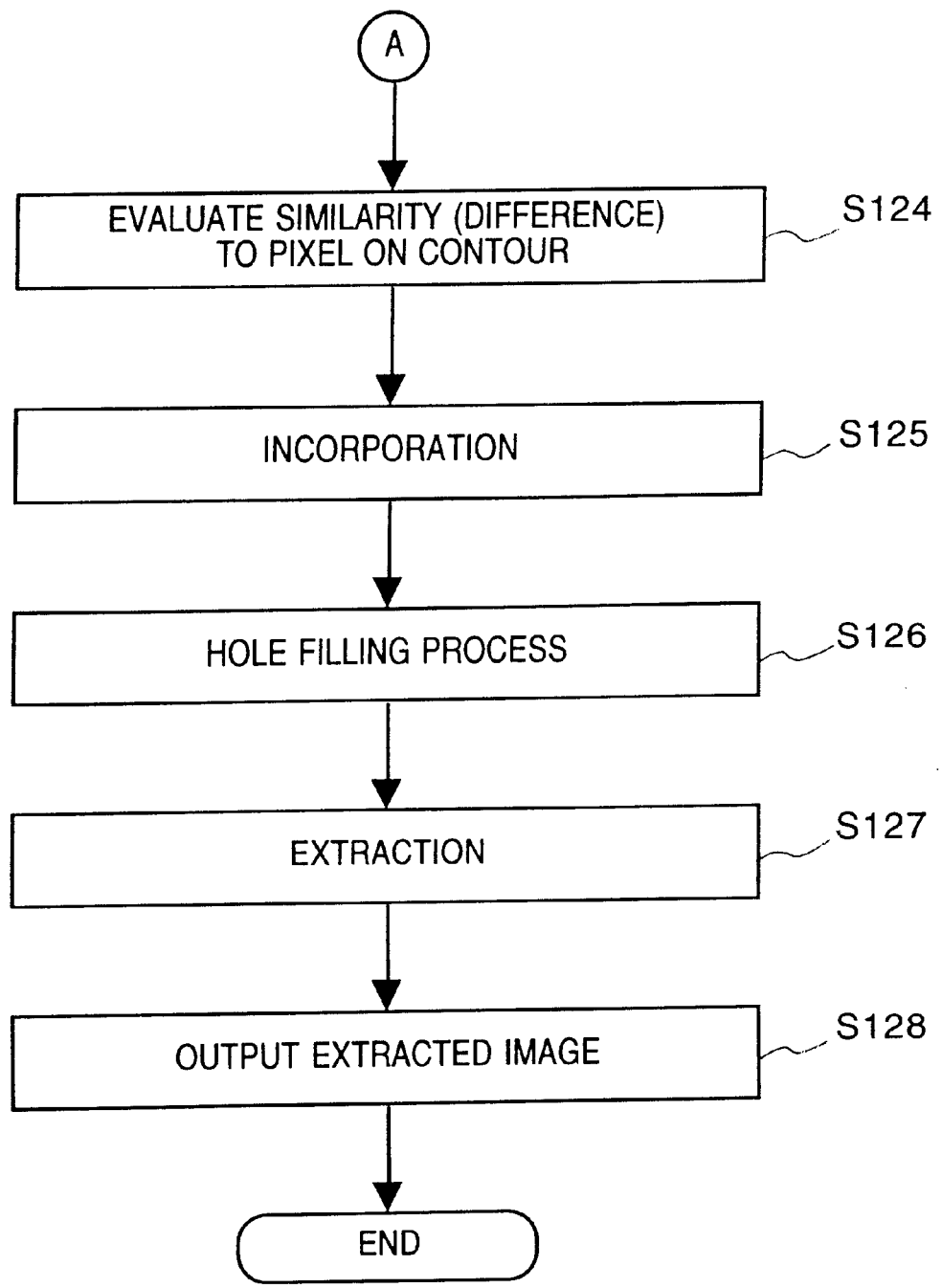

FIGS. 20A and 20B are flow charts showing the subject extraction process procedure according to the third embodiment.

In step S111, a subject image and a background image are input from the image sensing apparatus 1. In step S112, image data are subsampled in accordance with an appropriate reduction factor to increase the processing speed in the subsequent steps. In step S113, a processing region is set to include the subject on the subject image. Note that the subsampling process in step S112 and the processing region setting process in step S113 may be omitted. Steps S111, S112, and S113 are substantially the same as steps S11, S12, and S13 in the first embodiment.

The system of the third embodiment receives an input subject image (FIG. 4A) and a background image (FIG. 4B) as in the first embodiment.

Geometrical Transform

Steps S114 and S115 are optional processes. More specifically, when image sensing is done in the hand-held state without fixing the image sensing apparatus 1 to, e.g., a tripod or the background and subject images are sensed while automatically setting the exposure condition and focusing, the positions of the background and subject images must be adjusted. In steps S114 and S115, position adjustment is performed. When image sensing is not performed in the hand-held state, an exposure state, and a focus state are fixed, neither geometrical transform nor color adjustment are necessary, and the need for steps S114 and S115 is obviated.

In step S114, parameters that express geometric transformation (e.g., affine transformation parameters) for matching each two certain corresponding points in the subject and background images each other, and level transformation parameters for matching the levels of R, G, and B components are extracted. In step S115, using the extracted parameters, the position adjustment (shift, rotation, and magnification conversion) between the subject and background images and level adjustment (estimation of a non-linear function for correction using the method of least squares or the like) of the color components (R, G, and B values) are performed.

With these process, the subject and background images substantially match in terms of their positions and colors.

As other matching parameters, statistics such as correlation coefficients among blocks each of which is defined to have each point as the center and has a predetermined size, the average value or standard deviation of pixel values in each block, or the like may be extracted by a threshold value process.

Initial Seed Extraction

Subsequently, in steps S116, S117, and S118, a process for extracting an initial seed serving as a seed of a region growing process is executed.

In step S116, a threshold value parameter for extracting an initial seed is set. This parameter may use a predetermined value or may be input by the user. When a relatively large threshold value to be used in initial seed extraction is set, the influence of variations in pixel values due to noise and image sensing condition differences can be eliminated, and a light shadow and the like can be removed.

In step S117, the differences between the color components (R, G, and B values or hue, saturation) of the background and subject images in units of pixels are calculated, and are binarized using the threshold value determined in step S116. This binary image (an image having "0"s and "1"s alone) is an initial seed.

Figure 21A:
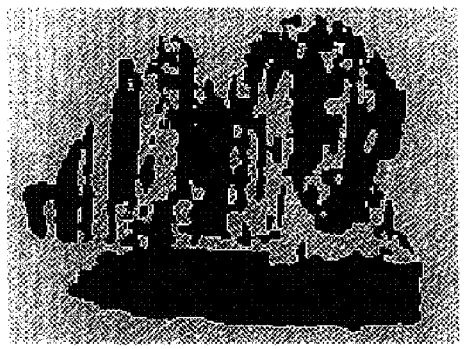
FIGS. 21A and 21B show pictures of images that represent principal intermediate results of the subject extraction process in the third embodiment.
Figure 21B:
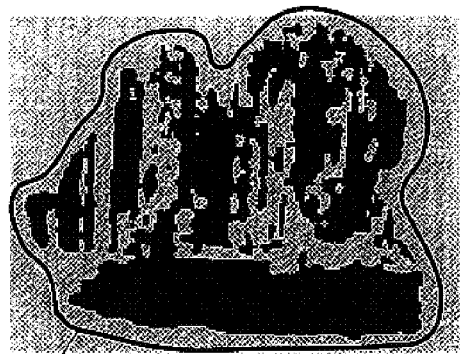

FIG. 21A shows the mask region obtained by initial seed extraction (the subject region is indicated by a black portion). The above-mentioned process is executed by the initial mask region extractor 5 in the extraction apparatus 2 shown in FIG. 19. In place of the initial mask region extractor 5, the process may be executed by a program in a computer of the terminal apparatus 10.

With the above-mentioned processes, the initial seed as a binary image is obtained. FIG. 21A shows the relationship between the subject image and mask image.

Region Growing

In a general combination of a background and subject, the region of the subject to be extracted cannot be completely extracted yet in this process; the initial seed cannot be directly used as the mask. More specifically, when the subject and background images have regions in which the R, G, and B levels or their local statistics (average values, standard deviations, or the like) are similar to each other at identical positions, such partial regions remain as non-extracted regions after the thresholding process. Hence, the subsequent region growing process (steps S119 to S125) retrieves such regions.

Figure 22:
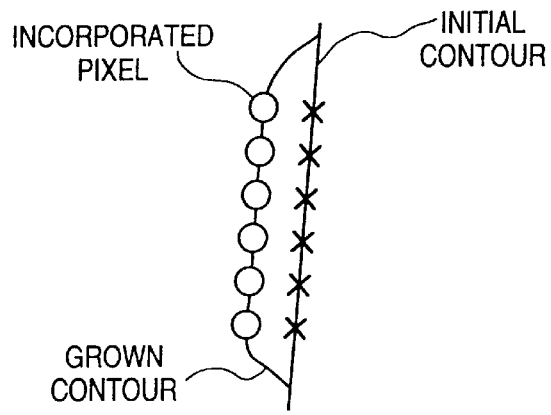
FIG. 22 is a view for explaining the operation principle of contour growing in the third embodiment.

In the region growing process, the similarity of image features between pixels (indicated by X in FIG. 22) and their neighboring pixels (or region) (pixels indicated by ○ in FIG. 22) on the subject image corresponding to the boundary of the initial mask is calculated, and if the calculated similarity is higher than a predetermined threshold value, the neighboring pixels are considered as those within the subject region and are incorporated in the mask region. This process is executed by the initial growing module 6 in the extraction apparatus 2 shown in FIG. 19. In place of the initial growing module 6, the process may be executed by a program in a computer of the terminal apparatus 10.

The region growing of the third embodiment will be described below. The region growing is performed based on image data of the subject image.

Prior to the region growing, the extraction process of the edge intensity distribution of the subject image is performed in step S119. More specifically, the edge image of the subject image is extracted. The edge intensity distribution image has gradation values. In step S120, the edge intensity image is binarized using a predetermined threshold value. That is, a binary edge image is obtained. The binary edge image is used in setting a threshold value distribution (step S123; to be described later).

Figure 23:
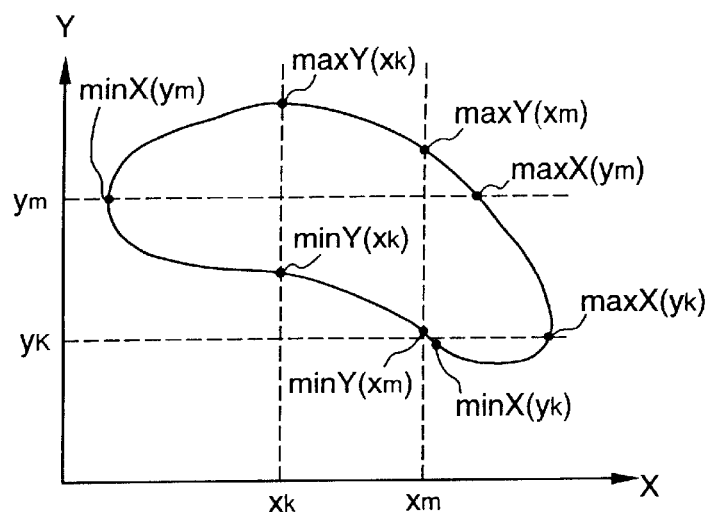
FIG. 23 is a view for explaining generation of a maximum range of a threshold value distribution in the third embodiment.

In step S121, in order to limit the range of the region growing of the initial seed, the maximum region growing range is set. This maximum range is set based on region data (coordinate data) of the initial seed. More specifically, the maximum range is defined by a set of minimum and maximum values ( . . . , MaxY($x_k$), . . . , MaxY($x_m$), . . . , . . . MinY($x_k$), . . . , MinY($x_m$) . . . ) of y-coordinates at the individual points in the horizontal (x) direction of the region where the initial seed is present, and a set of minimum and maximum values ( . . . , MaxX($y_k$), . . . , MaxX($y_m$), . . . , MinX($y_k$), . . . , MinX($y_m$), . . . ) of x-coordinates at the individual points in the vertical (y) direction, as shown in FIG. 23.

Figure 24:
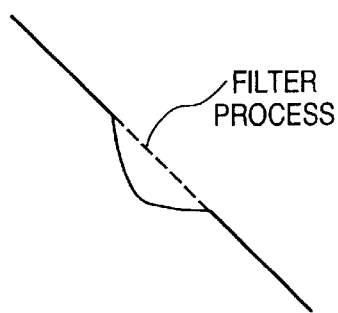
FIG. 24 is a view for explaining the effect of a smoothing filter in the third embodiment.

In order to optimize the outermost contour, smoothing (using a low-pass filter) may be performed. The smoothing uses a median filter of a predetermined size. The smoothing using the median filter can suppress abrupt variations in the initial seed, and can provide a smooth maximum growing region roughly along the contour shape of the object, as shown in FIG. 24. FIG. 21A shows an example of the maximum region growing range after the filter process.

Figure 26:
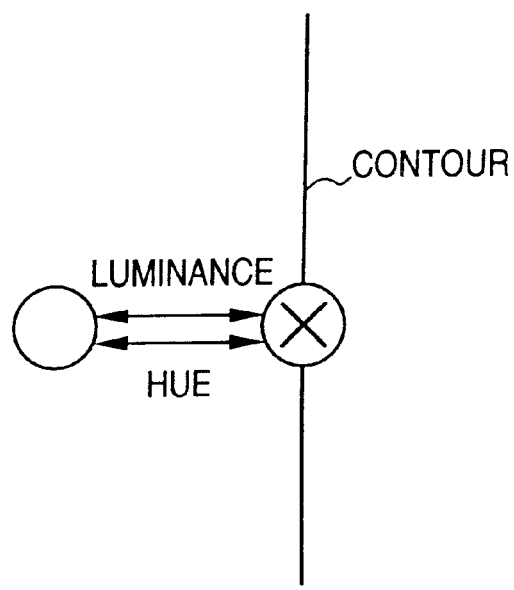
FIG. 26 is a view for explaining the technique of similarity determination in the third embodiment.

The region growing of a seed in the third embodiment is attained by incorporating a point, which is located inside a boundary point of the seed and is "similar" to the boundary point, into the seed. The similarity between the two points is determined based on brightness and hue similarities between pixel values of a pixel (X) located on the boundary of the seed and its neighboring pixel (○), as shown in FIG. 26. In the third embodiment, the similarity is determined based on an absolute difference ΔP between the brightness values (or hue values) of a point on the boundary and the point of interest. That is, the absolute difference ΔP is compared with a predetermined threshold value $\delta_I$ (or $\delta_H$), and if the absolute difference ΔP is smaller than the threshold value, it is determined that these two points are "similar" to each other. That is, if the following relation holds, it is determined that the two points are similar to each other:

$\Delta P_I < \delta_I$ or $\Delta P_H < \delta_H$

The third embodiment is characterized in that the threshold value of similarity (i.e., difference) determination is distributed. In steps S122 and S123, this distribution is determined.

In step S122, an initial value $\delta_{I0}$ or $\delta_{H0}$ of the threshold value $\delta_I$ or $\delta_H$ required for determining the similarity (i.e., difference) is input.

In step S123, the threshold value is variably set in the three following ways on the basis of the maximum growing range determined in step S121 (also using the edge intensity distribution obtained in step S119 as needed).

In the first method, the threshold value applied to the pixels of the subject image included in the maximum growing range is set to be small, and the threshold value for pixels outside the range is set to be large. More specifically, the initial threshold value ($\delta_I$, $\delta_H$) is used as a large threshold value, and a value 10% the initial threshold value is used as a small threshold value. The first method weighs higher for pixels within the maximum growing range, in other words, the mask growing direction is constrained to be inside of the maximum growing range.

In the second method, as the distribution function of the threshold value, an arbitrary function which decreases as the distance from the boundary line of the maximum growing range toward the outside becomes larger is used. More specifically, since this distribution function assumes a larger value as the pixel is further from the contour line toward the outside of the contour line, it tends to suppress region growing in regions closer to the contour line. This is because the difference ΔP of the pixel of interest must be smaller than that small threshold value to incorporate the pixel of interest in the contour and, hence, only pixels having small differences ΔP can be incorporated in the contour.

Note that the distribution function need not be continuous but may be quantized. When a quantized distribution function is set, the threshold value assumes an identical value within the predetermined range.

Furthermore, as another distribution function, the threshold value $\delta_I$ may be independently set in the vertical and horizontal directions ($\delta_{Ix}$, $\delta_{Iy}$). In this case, inside the maximum growing range, as the pixel is farther from the contour line in the vertical (y) direction, $\delta_{Iy}$ is set at a larger value; as the pixel is farther from the contour line in the horizontal (x) direction, $\delta_{Ix}$ is set at a larger value.

In the third method, the threshold value distribution function is set based on the edge distribution in the image (binary image obtained in step S119) obtained by binarizing the edge intensity distribution of the subject image by the predetermined threshold value. More specifically, the value of the threshold value distribution function is set at a small value at the position of an edge and its neighboring positions. Also, the distribution function values are set so that the function assumes the smallest value at the edge position and increases slightly in correspondence with the distance from the edge at the neighboring position of that edge. For example, if the function assumes a value "0" at the edge position, the region growing in a direction crossing the edge is perfectly inhibited. On the other hand, the distribution function may be set to assume a uniformly small value at the edge position and its neighboring positions.

Figure 27:
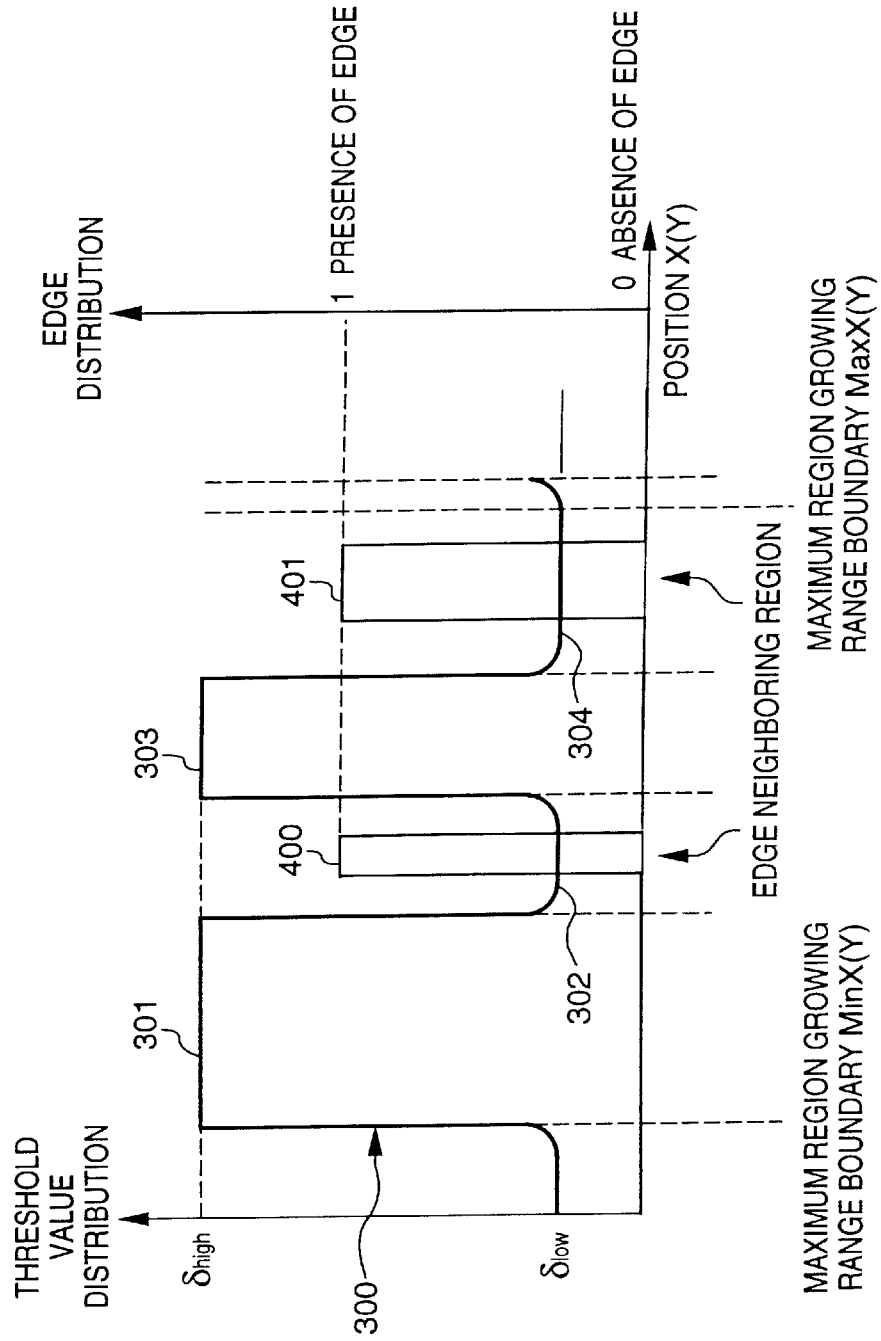
FIG. 27 is a view showing an example of the threshold value distribution in the third embodiment.

FIG. 27 shows an example of the distribution function set by the third method. In FIG. 27, the bold solid line indicates the threshold value distribution, and the thin solid lines indicate the distribution of edges. In this example, two edges (400, 401) are detected. A threshold value distribution function 300 assumes small values $\delta_{low}$ in the vicinity of the edges 400 and 401, and assumes larger values $\delta_{high}$ as the pixel position is farther from the vicinity of the edges. As a result, contour growing is suppressed in the vicinity of the edge.

Note that the boundary line of the maximum region growing range may be displayed on the display apparatus to be superposed on the input image, and the user may set an appropriate smoothing filter size based on the displayed range.

Figure 25A:
FIGS. 25A and 25B show pictures of halftone images that represent principal intermediate results of the subject extraction process in the third embodiment.

Subsequently, in step S124, the similarity (difference) between a pixel on the contour line and its neighboring pixel is determined. Especially, in this embodiment, if the absolute difference values $|\Delta P_{R,G,B}|$ of R, G, and B components between the pixel on the contour line and its neighboring pixel become equal to or smaller than a threshold value, or the absolute difference value of hue becomes equal to or smaller than a threshold value, it is determined in step S125 that the pixel on the contour line is similar to that neighboring pixel, and the neighboring pixel is incorporated in an identical subject region. FIG. 25A shows an example of the mask subjected to region growing by the method of the third embodiment.

According to any one of the threshold value setting methods, robustness and stability of the region growing with respect to the initial threshold value ($\delta_I$, $\delta_H$) can be achieved (variations in shape along the contour shape of the subject are small). Even when the maximum growing range is different from the outer contour shape of the subject, they may be roughly matched upon approximately setting the threshold value ($\delta_I$, $\delta_H$).

Furthermore, a hole filling process for automatically filling holes having a predetermined size or less in the region-grown mask data is executed (step S126).

Figure 25B:
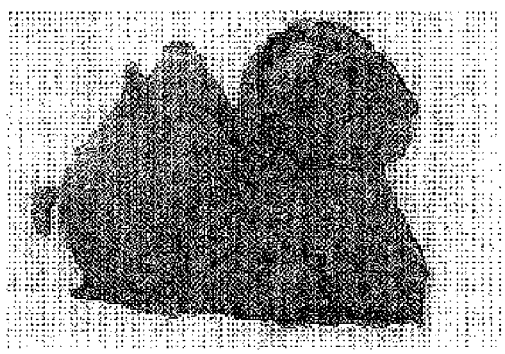

This hole filling process is performed independently of the subject image data, i.e., the similarities, uniformities, or the like of the image features to neighboring regions, and is performed for binary mask data. The grown region obtained as a result of the above-mentioned process is used as a subject extraction mask region, and the corresponding region is extracted from the subject image (step S127). The extracted image data (or an image file) is output to the display (step S128), thus ending the extraction process (see FIG. 25B).

<Modification of Third Embodiment>

The features used in similarity determination are not limited to the above-mentioned R, G, and B values or hue value. For example, features obtained by statistically processing low-order features such as saturation, higher level features such as the partial shape (the direction of segment) or local spatial frequency of a local line segment including an edge, and low-level features such as R, G, and B values and the like are preferably used.

The incorporation process of the region growing is not always limited to eight neighboring pixels, but a neighboring region obtained by another method may be used.

In the subject image extraction process (step S127), the subject image corresponding to the mask may be extracted after the smoothing process or correction process of the boundary line of the mask region. The extracted image output process (step S128) is performed by the subject image output unit 8 in the extraction apparatus 2 shown in FIG. 19. In place of the subject image output unit 8, the process may be executed by a program in a computer of the terminal apparatus 10.

Figure 15:
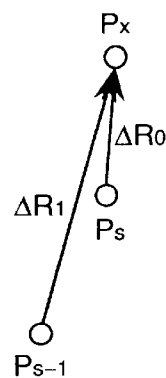
FIG. 15 is a view for explaining the processing principle of color continuity evaluation in the first embodiment.

The extraction apparatus 2 of the third embodiment may be implemented by various modes in addition to the above-mentioned hardware arrangement, such as one implemented by programs shown in the flow charts in FIGS. 14 and 15, one implemented by gate arrays, one built in the image sensing apparatus 1, and the like.

Note that the threshold value $\delta_I$ or $\delta_H$ may be automatically set on the basis of the statistics such as an average value, standard deviation, or the like, of the differences (difference absolute values) associated with the individual parameters between the background and subject images.

<Fourth Embodiment>

Figure 28:
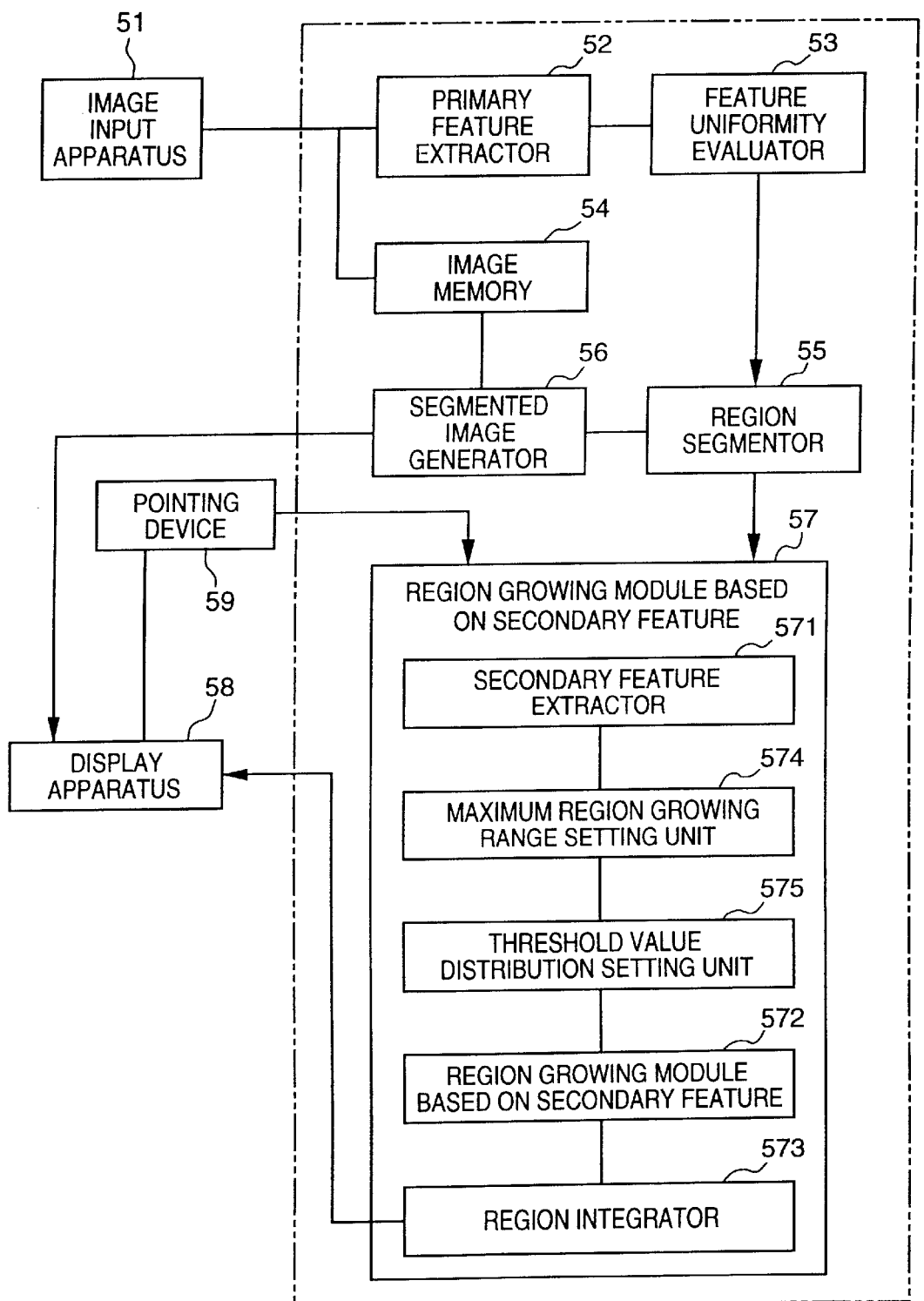
FIG. 28 is a block diagram showing the arrangement of an image sensing system in the fourth embodiment.

FIG. 28 is a block diagram showing the arrangement of an image sensing system according to the fourth embodiment. In FIG. 28, reference numeral 51 denotes an image input apparatus which corresponds to an image sensing apparatus or an image data base unit. The image sensing apparatus is not particularly limited, but a video camera, a binocular camera, or the like may be used.

Reference numeral 52 denotes a primary feature extractor for extracting primary feature data of an image; and 53, a characteristic uniformity evaluator for evaluating the uniformity of the feature data. Reference numeral 54 denotes an image memory; 55, a region segmentator for segmenting an image into a plurality of regions on the basis of the uniformities of the feature data; 56, a divided image generator; and 57, a growing module based on the secondary feature of an image. Reference numeral 58 denotes a display apparatus. Reference numeral 59 denotes a pointing device (e.g., a mouse) for designating the segmented region to be selected.

In the fourth embodiment, region growing is attained in such a manner that the uniformity of features in a predetermined region in an image is evaluated, and regions are segmented or integrated so that pixels having uniform features belong to a single region. This embodiment is characterized in that primary feature data in an image are extracted, and the above-mentioned region segmentation of the image is done based on the extracted distribution, thereby roughly extracting image regions which may be extracted. In the next step, to attain fine extraction, region growing based on secondary features (those having different types and attributes from those of the primary feature data) using region candidates as seeds is performed in the same manner as in the third embodiment. Assume that the regions extracted based on the primary feature data include image information required for performing region growing based on the secondary feature data.

In the fourth embodiment, the secondary feature can be basically different from the primary feature, but does not mean any limitations such as data having a geometric structure or data having high-order feature obtained by processing a brightness distribution and color components, and the like. For example, color component information or the like is conveniently used. The secondary feature may have the same type as the primary feature (in this embodiment, a motion vector or disparity vector) as long as the image can be segmented more finely by region growing. For example, the second feature differs from the first feature is resolution.

The objective of detecting the primary feature data is to allow the operator to make rough selection and designation upon extracting the image regions to be specified in practice or to facilitate automatic extraction processing since high-speed extraction of regions that serve as growing seeds in the region growing process can be attained.

As the primary feature data, when time-serial image data are input from the image input apparatus 51, the motion vector distribution of the individual points on the screen is used, or when images input from a multi eye camera are used, the disparity vector distribution of corresponding points between right and left images is used. The primary feature extractor 52 may have slightly lower extraction precision than the precision (resolving power) of a secondary feature extractor 571 used subsequently, but may preferably attain high-speed extraction. For this purpose, dedicated hardware for extracting primary feature data and combining uniform regions may be set.

Figure 29:
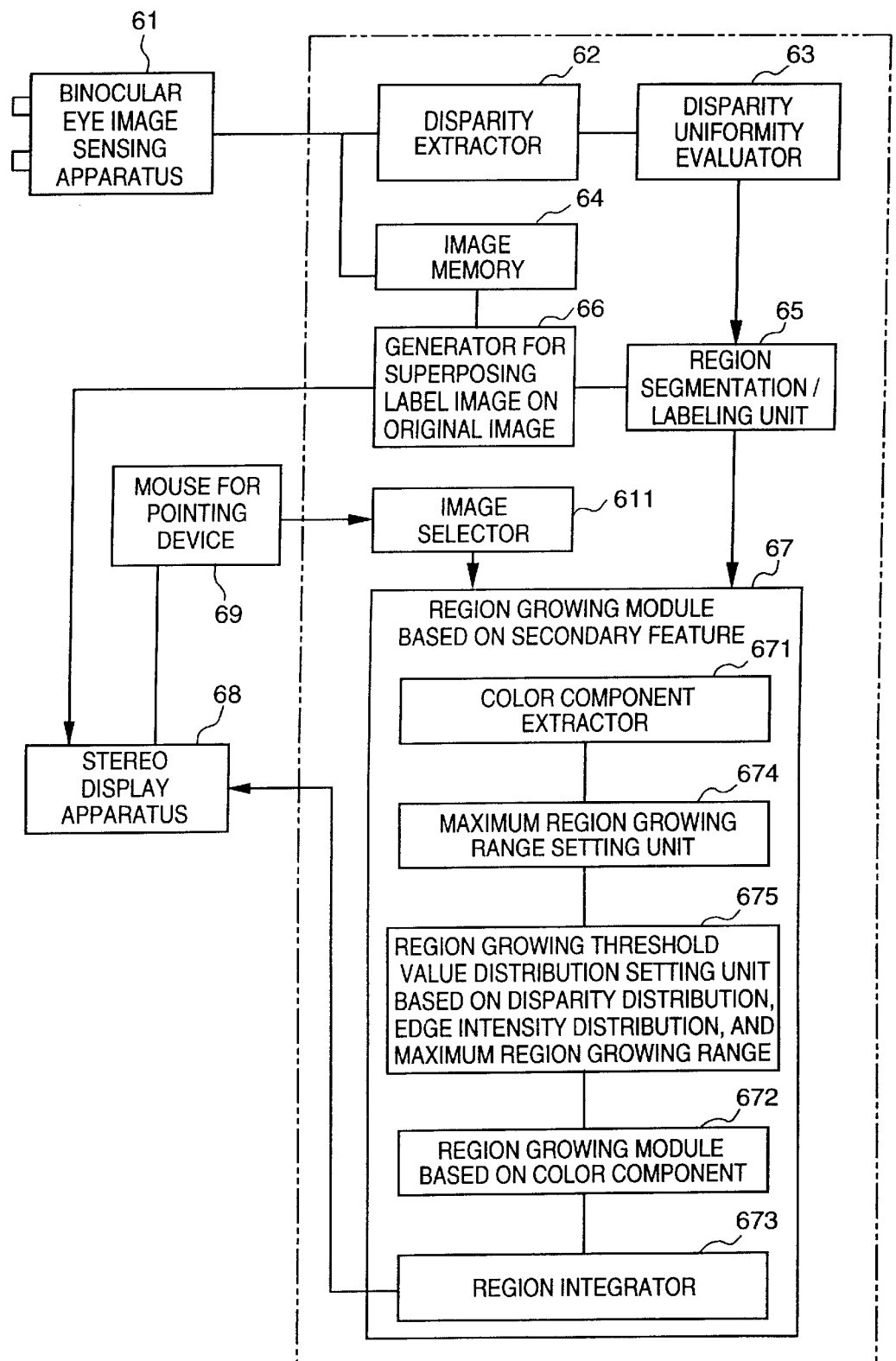
FIG. 29 is a block diagram showing the arrangement of the image sensing system in FIG. 28 in detail.

FIG. 29 is a block diagram showing the detailed arrangement of the image sensing system shown in FIG. 28. Note that the detection algorithm of disparity vectors (motion vectors) is not the gist of the present invention, and a detailed description thereof will be omitted (see Yachida, "Robot Vision", Seikodo, and the like).

In the fourth embodiment, the uniformity of feature data is expressed by a variance associated with the magnitude and direction of a primary feature (motion vector, disparity vector, or the like) within the predetermined region.

By appropriately setting the size of the region (block) to be evaluated on the basis of the size of an object in the frame, the processing time can be shortened, and high efficiency can be realized. More specifically, a segmented region about a fraction to ¹⁄₁₀ of the size of the object in the frame is typically used. This value may be appropriately set in advance by the operator.

Figure 30:
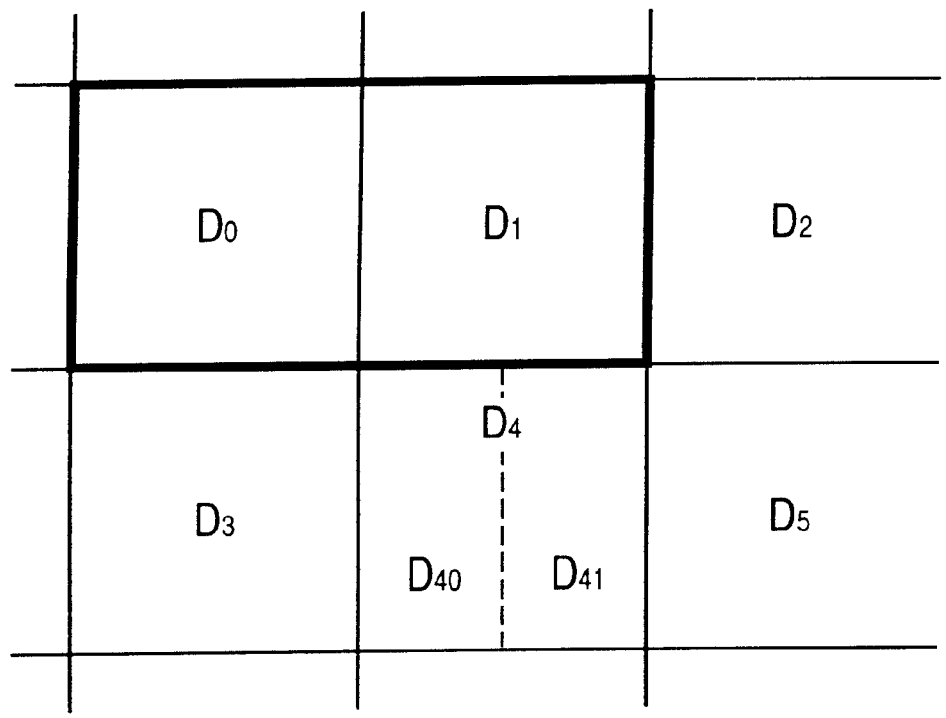
FIG. 30 is a view for explaining segmentation/integration of regions in the fourth embodiment.

The region segmentator 55 determines that the region is uniform when the uniformity value (for example, the variance of features in that region) is smaller than a predetermined threshold value, i.e., the variance is small. In FIG. 30, $D_0$ to $D_5$ are regions respectively including uniform features. If, for example, the uniformity representative values of the regions $D_0$ and $D_1$ are nearly equal to each other within a predetermined allowable range, i.e., $D_0$—$D_1$, the regions $D_0$ and $D_1$ can be connected to each other. If the region $D_4$ has a variance of the features ($D_{40}$ and $D_{41}$) falling outside the allowable range, and $D_{40}$—$D_3$ and $D_{41}$—$D_5$, the region $D_4$ is divided into regions $D_{40}$ and $D_{41}$, and the regions $D_{40}$ and $D_3$. and regions $D_{41}$ and $D_5$ can be respectively connected to each other. With this process, uniform massive regions that can be represented by primary features (disparity vectors, motion vectors, or the like) of constant values are formed.

This process can be considered as one of so-called region growing processes. However, in this process, the region growing conditions (restraints) as in the third embodiment are not given.

Figure 31A:
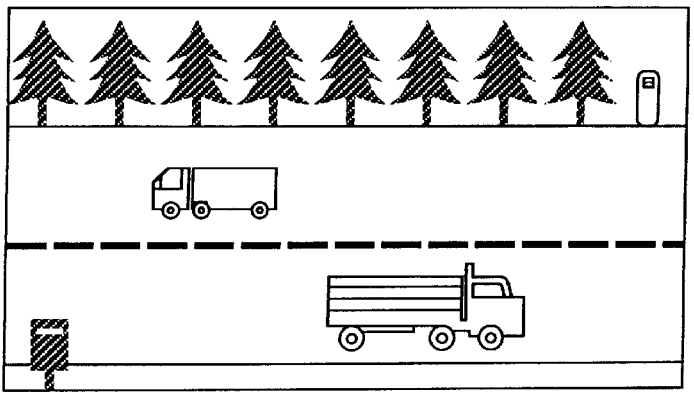
FIG. 31A is a view showing an example of an input image sensed by a binocular camera in the fourth embodiment.
Figure 31B:
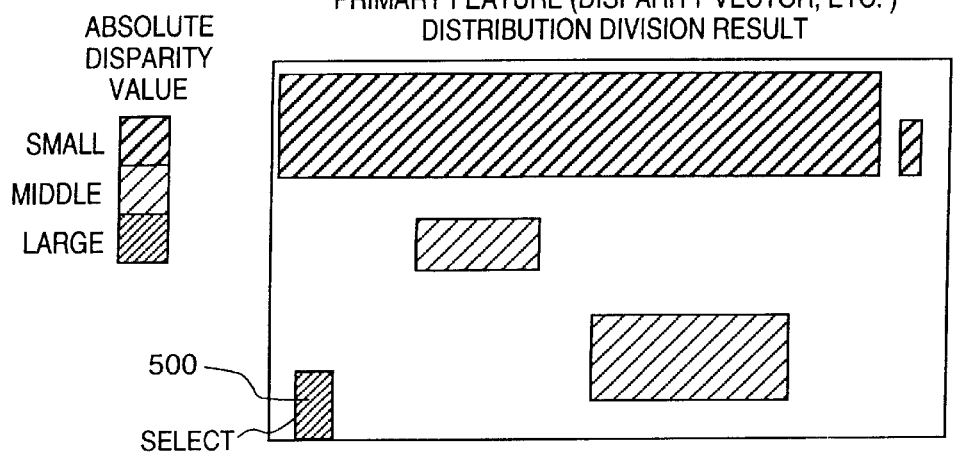
FIG. 31B is a view showing the rough region division result performed based on the magnitudes of disparity vectors in the fourth embodiment.
Figure 31C:
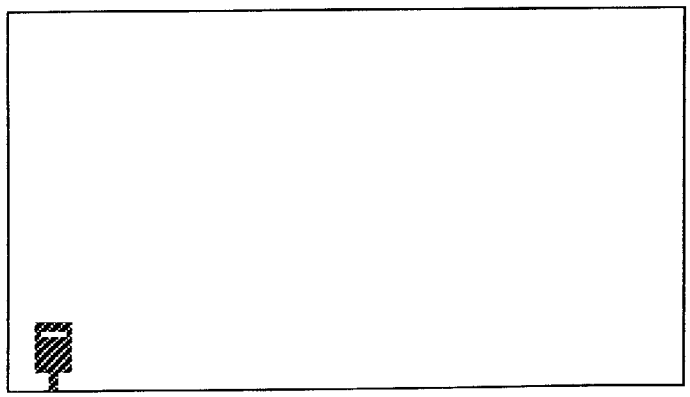
FIG. 31C is an explanatory view showing the image extraction result by region growing (and segmentation) on the basis of secondary characteristics such as color components in the fourth embodiment.

FIG. 31A shows an example of an input image sensed by a multi eye camera, FIG. 31B shows the rough region segmentation result based on the sizes of disparity vectors, and FIG. 31C is an explanatory view showing the image extraction result extracted by region growing (and division) based on secondary feature data such as color components.

FIG. 31B shows initial seeds extracted according to the primary features. In the example shown in FIG. 31B, three regions are extracted depending on the absolute disparity values. As shown in FIG. 31B, the initial seeds need not always accurately reflect the actual shape of an object as in the first embodiment, but no background region is preferably mixed in the divided regions (initial seeds). For this reason, after region division (after extraction of initial seeds), regions reduced at a predetermined ratio or erosion results of masks using a morphological operator may be used as the segmented regions (initial seeds).

On the other hand, when a background region is partially mixed in the initial seed region, that initial seed region is divided based on, e.g., color components, and region growing is performed after small regions including the contour line of the initial seeds are deleted, so that the subject shape can be extracted more accurately.

The segmented image (initial seed image) generator 56 assigns image data of different attributes (e.g., different colors, different hatching patterns, or the like) to a plurality of regions divided on the basis of primary feature data, and displays these regions on the display apparatus 58 to be superposed on the input image. More specifically, the generator 56 performs a process for labeling the segmented regions, and painting identical label regions by unique patterns (or colors).

With this process, the operator can easily visually confirm the region candidate to be designated, and can easily designate the object to be extracted using the pointing device 59. As the pointing device 59, a mouse (or a tablet) is normally used. When the image includes only one moving object or only one region having a disparity value falling within the predetermined range, no designation/selection is required. All of a plurality of extracted initial seeds may be used as region growing seeds.

In the example shown in FIG. 31B, a region 500 at the lower left end is selected.

The region growing module 57 comprises a secondary feature extractor 571 for extracting secondary feature data (e.g., hue, R, G, and B values, and the like) from the vicinity of the initial seed regions which are extracted and selected based on the primary feature data, a region growing module 572 based on the secondary feature data, a region integrator (hole filling means) 573 for connecting the grown regions, a maximum region growing range setting unit 574, and a threshold value distribution setting unit 575 for similarity evaluation of the secondary features with neighboring pixels.

The processing contents of the setting units 574 and 575 are the same as those in the third embodiment. As a threshold value distribution setting method unique to this embodiment, for example, discontinuous portions of primary feature factors (disparity vectors, motion vectors, or the like) in the initial seed region combined by designation/selection (or automatic process) are equivalently processed as those of secondary feature factors (R, G, and B values, hue, and the like), and the threshold value for similarity evaluation on such portions (and neighboring portions) may be set to be small.

Figure 32:
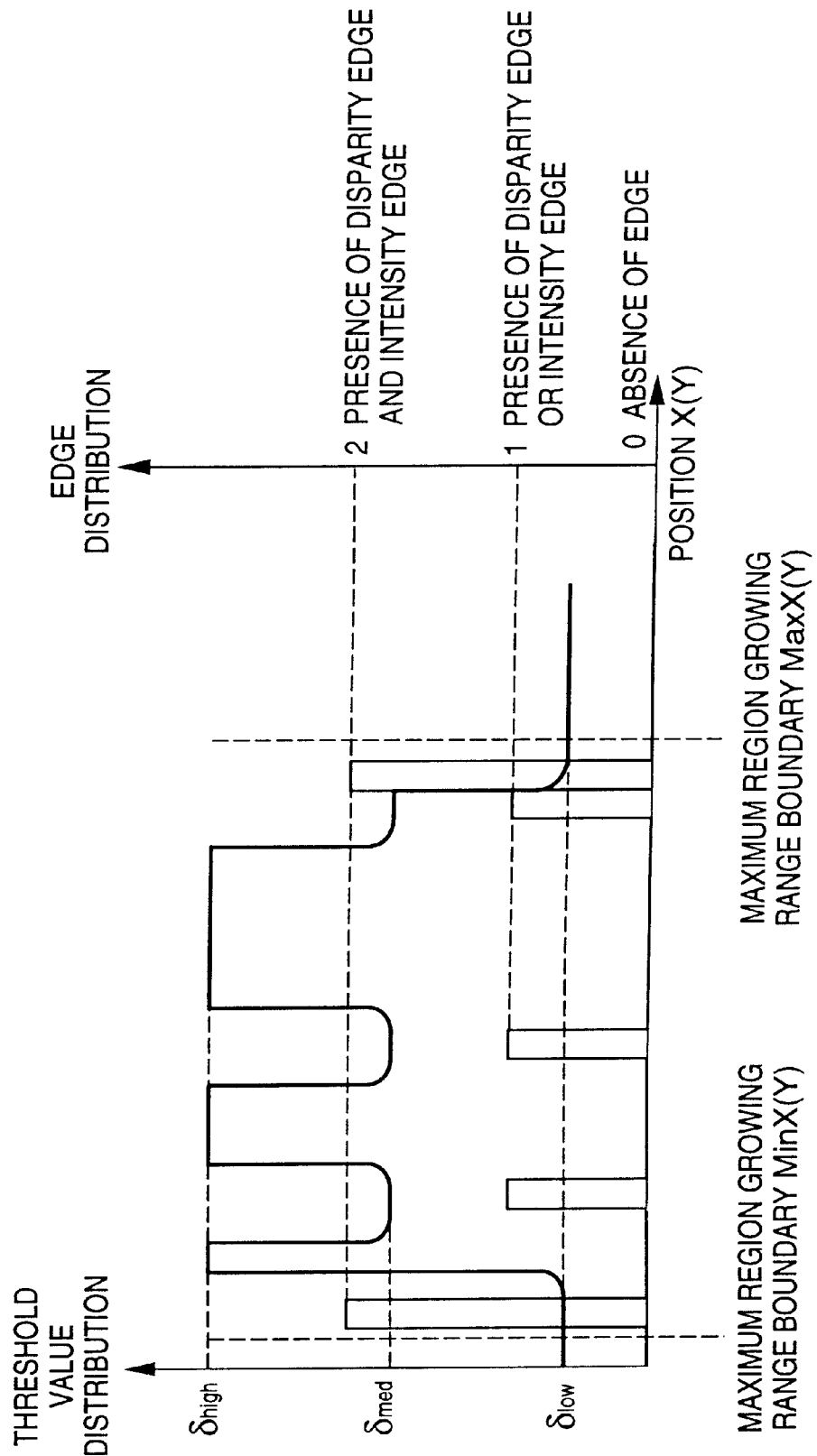
FIG. 32 is an explanatory view showing setting of the threshold value distribution of the fourth embodiment.

FIG. 32 is an explanatory view showing setting of the threshold value distribution according to the fourth embodiment. Note that a disparity edge means a portion where the rate of change in disparity vector becomes larger than a predetermined threshold value in a neighboring region including that point. In this case, when a so-called edge intensity distribution in an image (the intensity distribution or a distribution obtained by applying a differential operator such as a SOBEL operator to the intensity distribution of color components) and the disparity edge are observed at an identical point, the lowest threshold value ($\delta_{low}$) is set; when either one of these edges is observed, a middle threshold value is set; and when neither edges are observed, and the region does not belong to any regions in the vicinity of an edge, a high threshold value ($\delta_{high}$) is set.

Though a various embodiments which include a binocular camera have been described, the present invention is not limited to them. It may be applied to a system using multi-eye camera.

As many apparently widely different embodiments of the present invention can be made without departing from the spirit and scope thereof, it is to be understood that the invention is not limited to the specific embodiments thereof except as defined in the appended claims.

What is claimed is:

1. An image extraction method comprising:
   the partial region extraction step of extracting a partial region as a portion of a subject to be extracted from an input image;
   the region growing step of growing the extracted partial region using the extracted partial region as an initial mask by obtaining a similarity by comparing the partial region with the neighboring region with regard to a predetermined feature distribution and comparing the similarity with a predetermined threshold value which is set on the basis of a distribution of edge information; and
   the extraction step of extracting an image of the subject on the basis of the region-grown region.

2. The method according to claim 1, wherein the partial region extraction step includes the step of extracting the partial region on the basis of a difference between a background image excluding the subject, and a subject image including the subject.

3. The method according to claim 1, wherein the feature distribution is an edge distribution of the subject.

4. The method according to claim 1, wherein the feature distribution is a distribution within a maximum growing range set based on the partial region.

5. The method according to claim 1, wherein the threshold value is set to assume a value that suppresses growing of the region at an edge position as compared to a non-edge position.

6. The method according to claim 4, wherein the threshold value is set to assume a value that promotes growing of the region in a region within the maximum growing range, and to assume a value that suppresses growing of the region outside the maximum growing region.

7. The method according to claim 4, wherein the maximum growing range is obtained as an output when a shape of the partial region is smoothed using a smoothing filter having a predetermined size.

8. The method according to claim 1, wherein the input image includes time-serial images, and the partial region extraction step includes the step of extracting the partial region on the basis of difference data between image frames at different times of the input image.

9. The method according to claim 1, wherein the input image includes a plurality of images from a plurality of different view point positions, and the partial region extraction step includes the step of extracting the partial region on the basis of a disparity distribution between the input images.

10. An image extraction apparatus for extracting, from a first image including both a background and an object to be extracted, image data of the object using a mask, comprising:
    temporary storage means for receiving and temporarily storing the first image and a second image that records the background;

initial mask generation means for generating an initial mask of an extraction region on the basis of difference data between the stored first and second images;

region growing means for growing a region of the initial mask by obtaining a feature similarity by comparing the partial region with the neighboring region with regard to a predetermined feature information and comparing the similarity with a predetermined threshold value which is set on the basis of a distribution of edge information; and first image extraction means for extracting the image data of the object from the first image on the basis of the grown mask region.

11. The apparatus according to claim 10, wherein said initial mask generation means comprises:

first seed extraction means for extracting a color difference seed by performing a threshold value process of a difference between color components at individual points of the first and second images;

second seed extraction means for respectively extracting first and second edge intensity images from the first and second images, and extracting an edge difference seed by performing a threshold value process of difference data between the first and second edge intensity images; and generation means for generating an initial seed on the basis of outputs from said first and second seed extraction means.

12. The apparatus according to claim 11, wherein said first image extraction means comprises:

means for extracting difference edge data between the first and second images; and means for shaping a contour line of the object on the basis of the extracted difference edge data.

13. The apparatus according to claim 12, wherein said shaping means comprises:

threshold value process means for performing a threshold value process of the difference edge data or edge data of the first image;

first continuity evaluation means for evaluating shape continuity for edge candidates that remain after the threshold value process;

second continuity evaluation means for evaluating continuity of image features of the edge candidates;

edge selection means for selecting one of the edge candidates on the basis of outputs from said first and second continuity evaluation means; and smoothing means for smoothing an extracted contour line or a correction mask region including the contour line.

14. The apparatus according to claim 12, wherein said region growing means comprises:

means for determining a condition for suppressing a growing process; and means for determining a similarity.

15. An image extraction apparatus comprising:

partial region extraction means for extracting a partial region as a portion of a subject to be extracted from an input image;

region growing means for growing the extracted partial region using the extracted partial region as an initial mask by obtaining a similarity by comparing the partial region with the neighboring region with regard to a predetermined feature distribution and comparing the similarity with a predetermined threshold value which is set on the basis of a distribution of edge information; and extraction means for extracting an image of the subject on the basis of the region-grown region.

* * * * *